US010482357B2

(12) United States Patent
Yano et al.

(10) Patent No.: US 10,482,357 B2
(45) Date of Patent: Nov. 19, 2019

(54) OPTICAL PRINT HEAD AND IMAGE FORMING DEVICE

(71) Applicant: Konica Minolta, Inc., Tokyo (JP)

(72) Inventors: So Yano, Ibaraki (JP); Yoshikazu Watanabe, Toyohashi (JP); Sotaro Yokota, Toyohashi (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 15/879,559

(22) Filed: Jan. 25, 2018

(65) Prior Publication Data
US 2018/0218244 A1    Aug. 2, 2018

(30) Foreign Application Priority Data
Jan. 27, 2017   (JP) ................................. 2017-012652

(51) Int. Cl.
| G06K 15/12 | (2006.01) |
| G03G 15/043 | (2006.01) |
| G03G 15/04 | (2006.01) |
| B41J 2/45 | (2006.01) |
| H04N 1/028 | (2006.01) |

(52) U.S. Cl.
CPC .......... G06K 15/1247 (2013.01); B41J 2/451 (2013.01); G03G 15/043 (2013.01); G03G 15/04054 (2013.01); G03G 15/04063 (2013.01); H04N 1/02815 (2013.01)

(58) Field of Classification Search
None
See application file for complete search history.

(56) References Cited

U.S. PATENT DOCUMENTS

| 6,911,993 B2 * | 6/2005 | Nishikawa | B41J 29/393 |
| | | | 347/116 |
| 8,964,248 B2 * | 2/2015 | Kim | H04N 1/506 |
| | | | 358/1.9 |
| 2008/0130021 A1 | 6/2008 | Inoue et al. | |
| 2012/0162667 A1 | 6/2012 | Matsuo | |

FOREIGN PATENT DOCUMENTS

| JP | 2013195285 A | 9/2013 |
| JP | 2015-112856 A | 6/2015 |
| JP | 2015135408 A | 7/2015 |
| JP | 2016012052 A | 1/2016 |

OTHER PUBLICATIONS

Extended European Search Report dated Apr. 6, 2018 from corresponding European Application No. EP 18153777.0.

* cited by examiner

*Primary Examiner* — Alejandro Valencia
(74) *Attorney, Agent, or Firm* — Lucas & Mercanti, LLP

(57) ABSTRACT

An optical print head including light emitting elements, drivers, setters, a detector, and a generator. The detector is for detecting a noise component superimposed on a luminance signal, on transmission circuitry for transmitting the luminance signal from a setter to a driver, in a state in which the setter is outputting the luminance signal. The generator, for each light emitting element due to emit light in a line subsequent to a line for which the detector detected the noise component, generates and causes a setter corresponding to the light emitting element to output an adjusted luminance signal such that the light emitting element emits a light emission amount according to image data in a state in which the noise component detected by the detector is superimposed on the adjusted luminance signal.

9 Claims, 20 Drawing Sheets

FIG. 11

Id correction coefficient table 723

| Light amount | | Cumulative light emission time (h) | | | |
|---|---|---|---|---|---|
| | | 50 | 100 | ... | 1000 |
| | La | Cla50 | Cla100 | ... | Cla1000 |
| | Lb | Clb50 | Clb100 | ... | Clb1000 |
| | Lc | Clc50 | Clc100 | ... | Clc1000 |
| | Ld | Cld50 | Cld100 | ... | Cld1000 |

(Temperature = 0°C, Temperature = 10°C, ... Temperature = 80°C)

FIG. 12

Id initial data table 722

| Light amount | | OLED number | | | |
|---|---|---|---|---|---|
| | | 1 | 2 | ... | 15,000 |
| | La | Ila1 | Ila2 | ... | Ila15,000 |
| | Lb | Ilb1 | Ilb2 | ... | Ilb15,000 |
| | Lc | Ilc1 | Ilc2 | ... | Ilc15,000 |
| | Ld | Ild1 | Ild2 | ... | Ild15,000 |

Vsd detection data table 724

|  | | Detection value |
|---|---|---|
| OLED number | 1 | Vsd1 |
| | 2 | Vsd2 |
| | 3 | Vsd3 |
| | ... | ... |
| | 15,000 | Vsd15,000 |

Vsd-Id property table 721

FIG. 18
| | Phase | | | | | | |
|---|---|---|---|---|---|---|---|
| | 0° | 15° | 30° | ... | 315° | 330° | 345° |
| Noise component Ax | A000 | A015 | A030 | ... | A315 | A330 | A345 |
FIG. 19
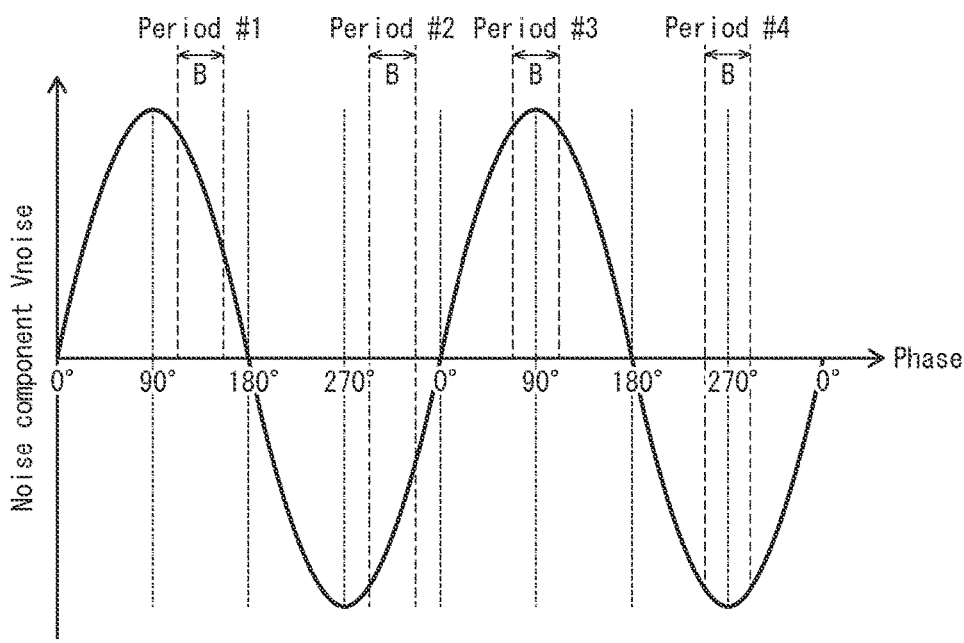
FIG. 20
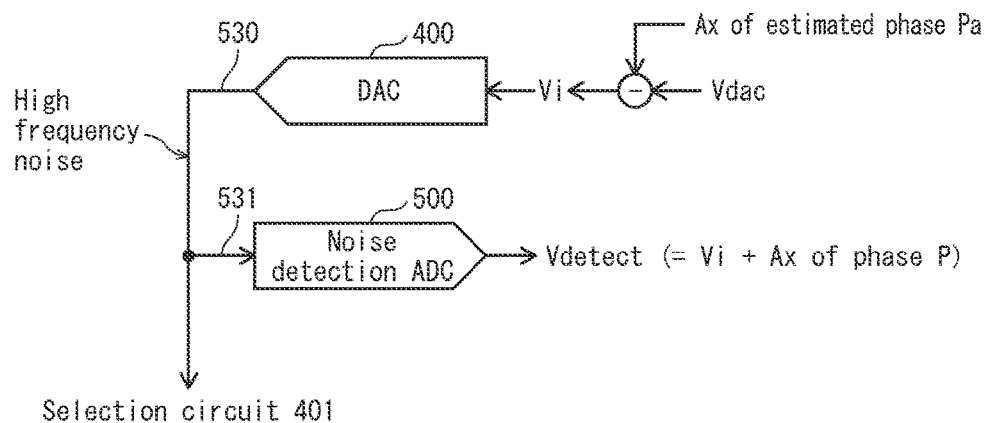

Period #3

Period #4

FIG. 24

| Noise component Ax | | Phase | | | | | | |
|---|---|---|---|---|---|---|---|---|
| | | 0° | 15° | 30° | ... | 315° | 330° | 345° |
| | 1st | A000 (1) | A015 (1) | A030 (1) | ... | A315 (1) | A330 (1) | A345 (1) |
| | 75th | A000 (75) | A015 (75) | A030 (75) | ... | A315 (75) | A330 (75) | A345 (75) |
| | 150th | A000 (150) | A015 (150) | A030 (150) | ... | A315 (150) | A330 (150) | A345 (150) |

|  | LPH | OLED-PH |
|---|---|---|
| Substrate | Glass epoxy substrate | Glass substrate |
| Multilayer wiring | Easy (10 or more layers) | Difficult (2 layers) |
| Power supply quality maintenance | High | Low |
| Noise resistance | High | Low |
| Writing voltage correction | Unnecessary | Necessary |

Noise strength

Concentration unevenness

OPTICAL PRINT HEAD AND IMAGE FORMING DEVICE

This application is based on and claims the priority of Japanese Patent Application No. 2017-012652 filed on Jan. 27, 2017, the contents of which are hereby incorporated by reference in their entirety.

BACKGROUND

Technical Field

The present disclosure relates to optical print heads and image forming devices, and in particular to techniques for suppressing concentration unevenness caused by high frequency noise.

Related Art

In recent years, demand for miniaturization of image forming devices has further increased. For this reason, in the field of optical print heads (PH), conventional optical scanning types using laser diodes (LD) as a light source are being switched out for linear optical types in which minute dot form light emitting elements are arranged in linear patterns. As linear optical types of optical print head, optical print heads using light emitting diodes (LED) in a light emitting unit (LED PH (LPH)) are being developed.

In an LPH, a drive circuit unit including a drive integrated circuit (IC) and the like for controlling each light emitting element and the light emitting unit is, for manufacturing reasons, necessarily mounted on a separate substrate from a light source substrate on which LEDs are mounted. Thus, parts costs and manufacturing costs increase.

As linear optical types of optical print head that can lower costs, organic light emitting diode print heads (OLED-PH) that use OLEDs in a light emitting unit have been proposed. In an OLED-PH, a light emitting unit and a thin film transistor (TFT) can be formed on the same substrate, and therefore a cost reduction can be achieved by forming a drive circuit unit and a light emitting unit on the same substrate.

However, as shown in FIG. 26, a charging device 2602, an optical print head 2600, a developer device 2603, a primary transfer roller 2604, and a cleaning device 2605 are disposed in this order around an outer circumferential surface of a photoreceptor drum 2601, which is a light exposure target of the optical print head 2600. Among these, there are noise sources such as the charging device 2602 and the developer device 2603, which generate high frequency noise. Further, the optical print head 2600 is disposed in the immediate vicinity of the photoreceptor drum 2601, and is therefore easily affected by such noise.

Typically, LPHs use a glass epoxy substrate that is easily multilayered, and therefore signal lines for writing luminance signals indicating light emission amounts of LEDs can be stably sandwiched in a power supply layer, preventing noise from reaching the signal lines, making it possible to stabilize image quality.

On the other hand, OLED-PHs typically use a glass substrate that is difficult to multilayer, and at most two layers are possible. Thus, it is not possible to adopt a structure that protects signal lines from noise, where the signal lines input luminance signals indicating light emission amounts of OLEDs (FIG. 27). High frequency noise generated by a charging device and the like is cyclic noise, and therefore when a signal line is influenced by such noise (FIG. 28A), cyclic unevenness in concentration occurs in a sub-scanning direction (FIG. 28B). In this way, OLED-PHs are not as noise resistant as LPHs.

In response to such problems with OLED-PH, a Countermeasure 1 has been proposed in which an analogue to digital converter (ADC) is installed for each light emitting element, noise is detected, and each luminance signal is corrected according the results of detection. Further, a Countermeasure 2 has been proposed in which an antenna is provided to detect noise and each luminance signal is corrected. As long as a luminance signal is appropriately corrected, unevenness in concentration caused by noise can be cancelled, obtaining high image quality.

However, an OLED-PH uses a large number of OLEDs, for example 15,000, and therefore if the same number of ADCs are mounted as in Countermeasure 1, panel width must be enlarged in a sub-scanning direction and costs increase.

Further, in OLED-PHs, a luminance signal from a digital to analogue converter (DAC) is input to a sample and hold circuit, and a drive current corresponding to the luminance signal held in the sample and hold circuit is supplied to an OLED, adjusting the amount of light emitted by the OLED. Although there is no leeway in the writing time to write this luminance signal from the DAC to the sample and hold circuit, wiring capacitance is increased when an ADC and wiring are connected to the sample and hold circuit, and therefore there is a problem that writing cannot be completed in the writing time of the luminance signal.

Further, according to Countermeasure 2, noise is not detected from the DAC wiring extending from the DAC to the sample and hold circuit, or directly from the sample and hold circuit itself, and therefore noise detection accuracy is low. Thus, a luminance signal cannot be corrected with high accuracy, which limits improvements in image quality.

SUMMARY

The present disclosure has been achieved in view of problems such as described above, and an aim of the present disclosure is to provide an optical print head and image forming device that can, at a low cost, improve accuracy of voltage written to a sample and hold circuit and improve accuracy of high frequency noise detection.

An optical print head pertaining to at least one aspect of the present invention is an optical print head including light emitting elements, drivers, setters, a detector, and a generator. The light emitting elements are arranged in a line-shaped region. The drivers correspond one to one with the light emitting elements, and are for causing the light emitting elements to emit light. The setters are for outputting luminance signals that indicate to the drivers light emission amounts of the light emitting elements according to image data, wherein light emitted by the light emitting elements exposes a photoreceptor surface line by line. The detector is for detecting a noise component superimposed on a luminance signal, on transmission circuitry for transmitting the luminance signal from a setter to a driver, in a state in which the setter is outputting the luminance signal. The generator, for each light emitting element due to emit light in a line subsequent to a line for which the detector detected the noise component, generates and causes a setter corresponding to the light emitting element to output an adjusted luminance signal such that the light emitting element emits a light emission amount according to the image data in a state in which the noise component detected by the detector is superimposed on the adjusted luminance signal.

BRIEF DESCRIPTION OF THE DRAWINGS

The advantages and features provided by one or more embodiments of the invention will become more fully understood from the detailed description given hereinafter and the appended drawings which are given by way of illustration only, and thus are not intended as a definition of the limits of the invention. In the drawings:

FIG. 10 is a flowchart describing a luminance signal correction operation to counter age deterioration and the like;

FIG. 11 shows tables describing data structure of Id correction coefficient table 723;

FIG. 12 shows a table describing data structure of Id initial data table 722;

FIG. 18 shows a table describing data structure of high frequency noise data table 726;

FIG. 19 is a graph illustrating noise component Ax;

FIG. 20 describes circuit configuration for detecting noise component Ax;

FIG. 24 shows a table describing data structure of high frequency noise data table 726 pertaining to a modification;

DESCRIPTION

The following describes an optical print head and an image forming device according to at least one embodiment of the present invention, with reference to the drawings.

[1] Image Forming Device

The following describes the main configuration of the image forming device pertaining to at least one embodiment.

Figure 1:
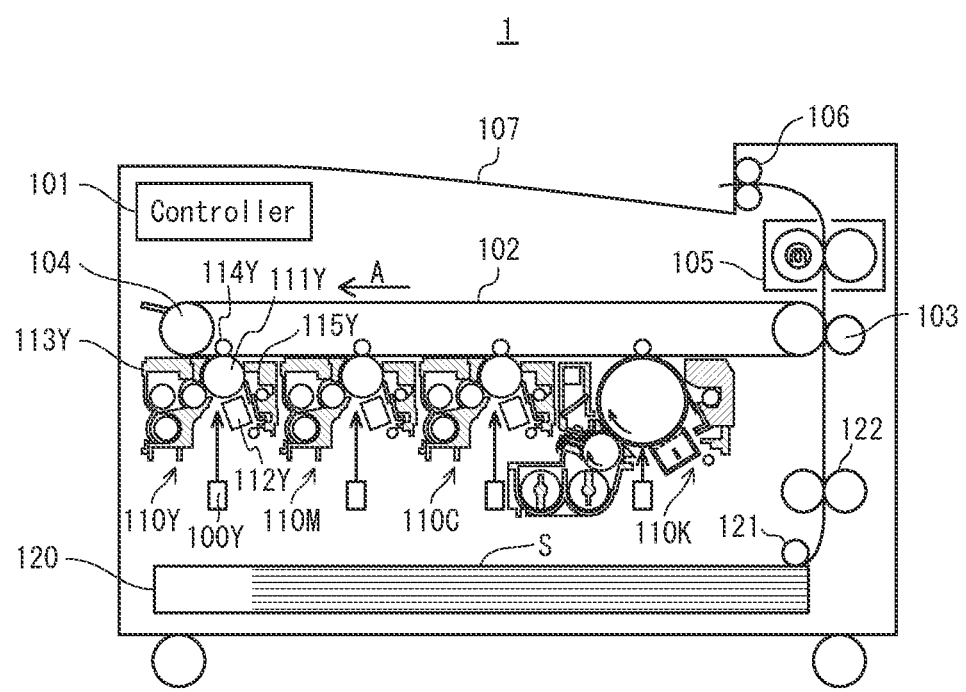
FIG. 1 shows major components of an image forming device pertaining to at least one embodiment of the present invention.

As shown in FIG. 1, an image forming device 1 is a tandem type of color printer. Imaging units 110Y, 110M, 110C, and 110K of the image forming device 1 form yellow (Y), magenta (M), cyan (C), and black (K) toner images, respectively, under control of a controller 101.

For example, in the imaging unit 110Y, a charging device 112Y, an optical print head 100Y, a developer device 113Y, a primary transfer roller 114Y, and a cleaning device 115Y are arranged around an outer circumferential surface of a photoreceptor drum 111Y in this order. The imaging unit 110Y rotates the photoreceptor drum 111Y while causing the charging device 112Y to uniformly charge the outer circumferential surface of the photoreceptor drum.

The optical print head 100Y exposes the outer circumferential surface of the photoreceptor drum 111Y to form an electrostatic latent image. The developer device 113Y supplies toner to the outer circumferential surface of the photoreceptor drum 111Y and develops (visualizes) the electrostatic latent image to form a Y toner image. The primary transfer roller 114Y electrostatically transfers (primary transfer) the toner image on the outer circumferential surface of the photoreceptor drum 111Y to an outer circumferential surface of the intermediate transfer belt 102. After the primary transfer, toner remaining on the outer circumferential surface of the photoreceptor drum 111Y is removed by the cleaning device 115Y, and residual electric charge is eliminated.

The intermediate transfer belt 102 is tensioned between a secondary transfer roller pair 103 and a driven roller 104, and runs in a direction A while carrying the toner image.

Similarly, M, C, and K toner images formed by the imaging units 110M, 110C, and 110K are transferred onto the outer circumferential surface of the intermediate transfer belt 102 at timings such that the toner images overlap the Y toner image, in order to form a color toner image. The intermediate transfer belt 102 conveys the color toner image to the secondary transfer roller pair 103.

A stack of recording sheets S is stored in a paper cassette 120, and a pickup roller 121 picks up the recording sheets S one by one. After a recording sheet S arrives at a timing roller 122 and conveyance is temporarily stopped, the recording sheet S is conveyed to the secondary transfer roller pair 103 at a timing matched to conveyance of the color toner image by the intermediate transfer belt 102.

The secondary transfer roller pair 103 electrostatically transfers (secondary transfer) the toner image on the intermediate transfer belt 102 to the recording sheet S. The recording sheet S with the toner image transferred thereon is discharged onto a discharge tray 107 by a discharge roller 106 after heat fixing of the toner image at a fixing device 105.

The controller 101 is connected to an operation panel (not illustrated), which displays information to and receives input from a user of the image forming device 1.

The following describes configuration common to the imaging units 110Y, 110M, 110C, and 110K, and therefore the reference characters Y, M, C, and K are omitted.

[2] Optical Print Head 100

The following is a description of the optical print head 100.

(2-1) Configuration of Optical Print Head 100

Figure 2:
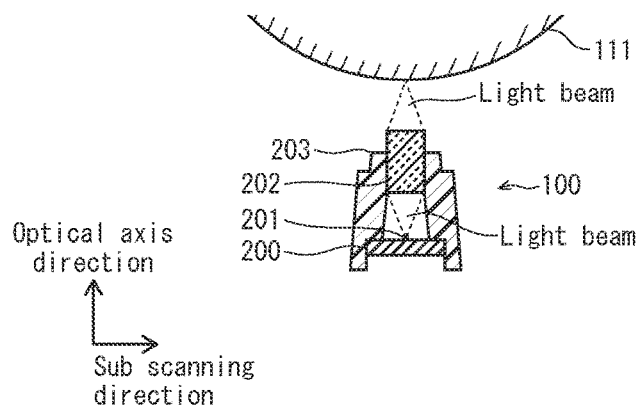
FIG. 2 shows major components of optical print head 100.

As in FIG. 2, the optical print head 100 includes an OLED panel 200 and a lens array 202 held by a holder 203, and is elongated in a main scanning direction (perpendicular to the plane of FIG. 2 itself). OLEDs 201 are arranged along the main scanning direction in one or more staggered arrangements on the OLED panel 200.

Light beams L emitted by the OLEDs 201 are collected by the lens array 202 and irradiate the outer circumferential surface of the photoreceptor drum 110. The lens array 202 is an optical element that integrates a large number of lenses (according to at least one embodiment, rod lenses). As the lens array 202, a Selfoc lens array (SLA, Selfoc is a registered trademark of Nippon Sheet Glass Co., Ltd) or a micro lens array (MLA) may be used.

Positions of individual lenses of the lens array 202 and individual OLEDs 201 relative to each other vary, and therefore imaging efficiency of the OLEDs 201 is not constant. Thus, if all the OLEDs 201 emit equal amounts of light, unevenness occurs in exposure amounts for each of the OLEDs 201 on the outer circumferential surface of the photoreceptor drum 111. According to at least one embodiment, in an initial state (factory shipment state), a light amount that does not cause unevenness in exposure amounts (hereinafter, "set light amount") is set for each of the OLEDs 201.

The optical print head 100 includes a cable and other components (not illustrated) necessary for connecting to another device in the image forming device 1.

(2-2) Configuration of OLED Panel 200

Figure 3:
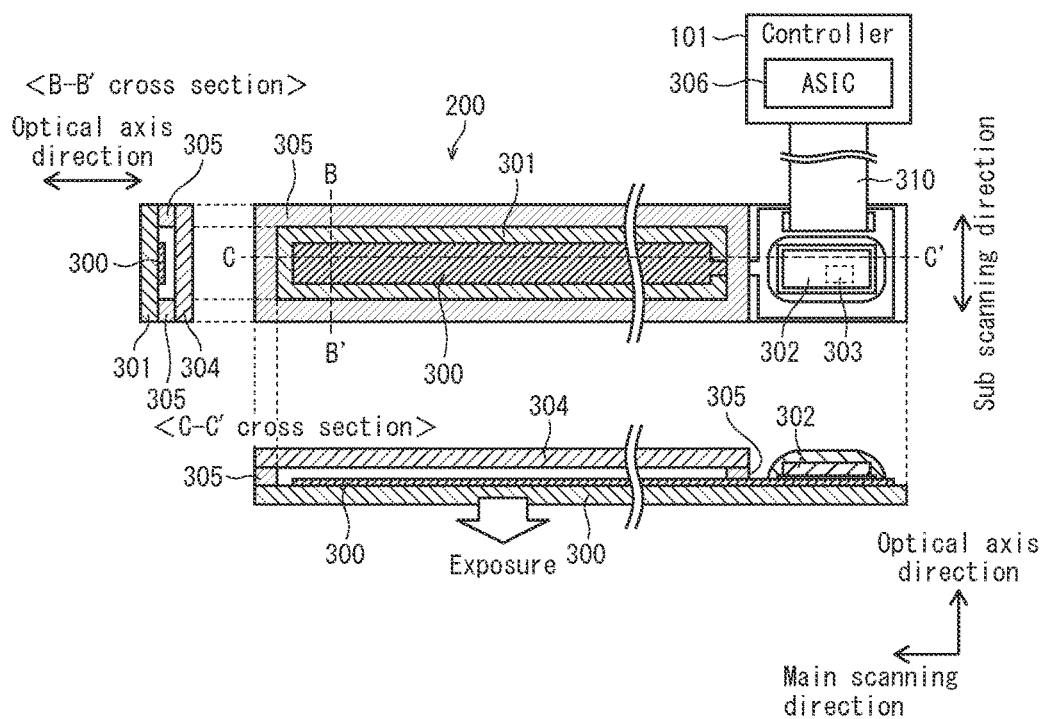
FIG. 3 shows a schematic plan view of OLED panel 200, a B-B' cross section, and a C-C' cross section.

FIG. 3 is a schematic plan view of the OLED panel 200, and includes a cross-section taken along the line B-B' and a cross-section taken along the line C-C'. Further, in the schematic plan view, the OLED panel 200 is shown in a state after removal of a sealing plate 304 (described later).

As illustrated in FIG. 3, the OLED panel 200 includes a thin film transistor (TFT) substrate 300 and a drive integrated circuit (IC) 302. The TFT substrate 300 is formed on a glass substrate 301, and 15,000 OLEDs 201 are mounted thereon. The OLEDs 201 are arranged such that focus points on the outer circumferential surface of the photoreceptor drum 111 are arranged with a 21.2 μm pitch (1200 dpi).

The sealing plate 304 is attached via a spacer frame 305 to a main surface of the glass substrate 301 on which the TFT substrate 300 is formed. Thus, the OLEDs 201 and the like mounted on the TFT substrate 300 are sealed in a state in which dry nitrogen or the like is enclosed, such that contact with air is suppressed. A moisture absorbent may also be enclosed. The sealing plate 304 may be a sealing glass or another material.

The drive IC 302 is mounted outside a sealed region sealed by the glass substrate 301. The controller 101 includes an application specific integrated circuit (ASIC) 306. The ASIC 306 inputs image data to the drive IC 302 via a parallel multi-core electric cable (or flexible flat cable (FFC)) 310. The drive IC 302 generates a luminance signal from the image data. An OLED 201 receives drive current according to the luminance signal, and emits a light amount according to the luminance signal. The luminance signal may be a current signal or a voltage signal.

The drive IC 302 includes a temperature sensor 303. The temperature sensor 303 detects environment temperature of the OLEDs 201.

(2-3) Configuration of TFT Substrate 300

The following describes configuration of the TFT substrate 300.

Figure 4:
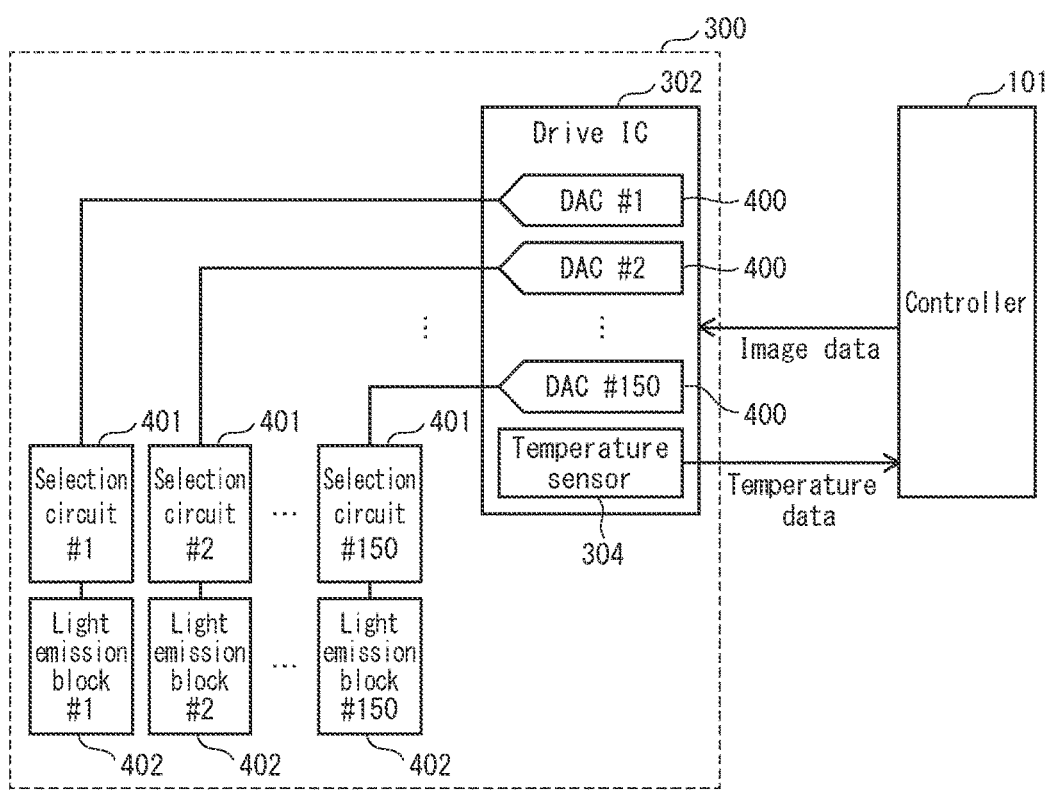
FIG. 4 is a block diagram illustrating a schematic circuit configuration of TFT substrate 300.

FIG. 4 is a block diagram of a schematic circuit configuration of the TFT substrate 300.

In FIG. 4, on the TFT substrate 300, 15,000 OLEDs 201 are divided into 150 light emitting blocks 402 of 100 OLEDs 201 each. The 150 light emitting blocks 402 are arranged along the main scanning direction. 150 DACs 400 are included in the drive IC 302 in one-to-one correspondence with the light emitting blocks 402. The controller 101 can reference a detected temperature of the temperature sensor 303 in the drive IC 302.

When the controller 101 inputs image data to the drive IC 302, the drive IC 302 inputs the image data to the DACs 400, 100 pixels of the image data to a DAC 400 in each scanning period. The DACs 400 convert each of the 100 pixels of the image data into sequential luminance signals and input same to selection circuits 401. The selection circuits 401 cause the OLEDs 201 of corresponding light emitting blocks 402 to emit light according to the luminance signals.

The following describes further details of circuit configuration of the TFT substrate 300. The following describes a drive TFT 522 as a p-channel type, but of course an n-channel type may be used.

(2-3-1) Circuit Configuration for Causing the OLEDs 201 to Emit Light

The TFT substrate 300 supplies drive current to the OLEDs 201 according to image data, causing the OLEDs 201 to emit light amounts.

(2-3-1-1) Light Emitting Blocks 402

Figure 5:
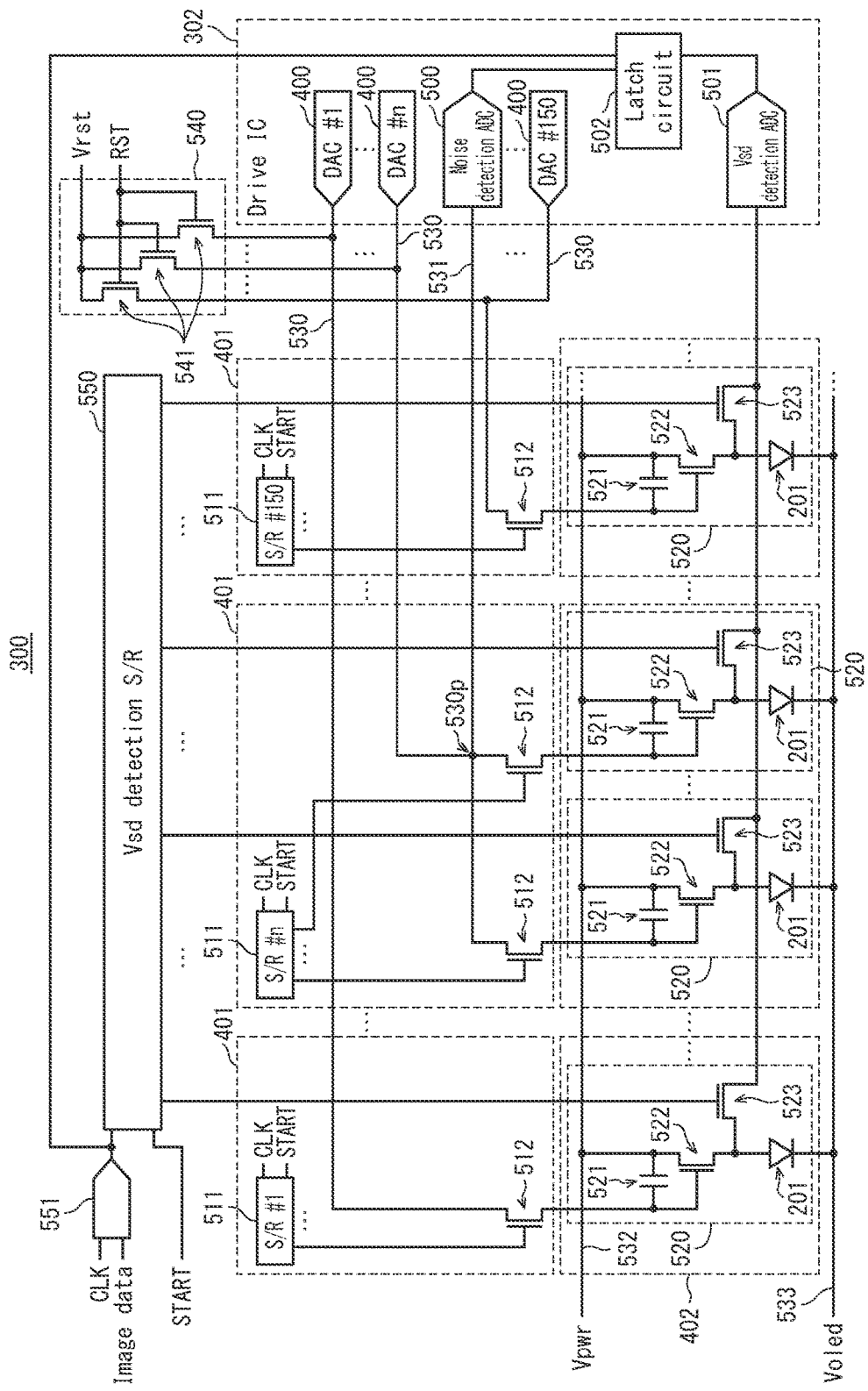
FIG. 5 is a diagram illustrating a schematic circuit configuration of TFT substrate 300.

In FIG. 5, 15,000 light emission pixel circuits 520 are mounted on the TFT substrate 300, and are divided into the 150 light emitting blocks 402 as sets of 100 light emission pixel circuits 520. The light emitting blocks 402 correspond one-to-one with the selection circuits 401. The selection circuits 401 each include an OLED selection shift register 511 and 100 OLED selection TFTs 512.

The OLED selection TFTs 512 correspond one-to-one with the light emission pixel circuits 520. When the OLED selection shift registers 511 sequentially select the OLED selection TFTs 512 in each main scanning period, pixel signals from the DACs 400 of the drive IC 302 are inputted to the light emission pixel circuits 520 corresponding to selected ones of the OLED selection TFTs 512. The 150 DACs 400, which correspond one-to-one with the light emitting blocks 402, are included in the drive IC 302. In this way, 100 light emission pixel circuits 520 share time with one DAC 400.

(2-3-1-2) Light Emission Pixel Circuits 520

The light emission pixel circuits 520 are circuits for causing the OLEDs 201 to emit light.

The 15,000 light emission pixel circuits 520 all have the same configuration, and are connected in series to the OLEDs 201 and the OLED drive TFTs 522. Each source terminal of the OLED drive TFTs 522 is connected to a constant-voltage source Vpwr via power supply wiring 532, and to a terminal of capacitors 521. Each gate terminal of the OLED drive TFTs 522 is connected to a drain terminal of the OLED selection TFTs 512 and a corresponding opposing terminal of the capacitors 521.

Drain terminals of the OLED drive TFTs 522 are connected to anode terminals of the OLEDs 201 and source terminals of Vsd detection TFTs 523. According to such connections, the OLED drive TFTs 522 supply drain current according to held current of the capacitors 521 as drive current to the OLEDs 201. The constant-voltage source Vpwr is a common supply source of drive current supplied to the OLEDs 201.

The drive TFTs 522 supply held current of the capacitors 521, that is drain current according to gate-source voltage Vgs of the drive TFTs 522, to the OLEDs 201 as drive current. Of course, the higher the gate-source voltage Vgs, the greater the drive current supplied by the drive TFTs 522, and the greater the light amount of the OLEDs 201.

For example, when a luminance signal corresponding to "Hi" is written to a capacitor 521, a drive TFT 522 is turned on, and an OLED 201 emits a light amount corresponding to the drive current. Further, when a luminance signal corresponding to "Low" is written to a capacitor 521, a drive TFT 522 is turned off, and an OLED 201 does not emit light. Thus, light amount of the OLEDs 201 can be controlled according to changes in luminance signal outputted by the DACs 400.

Each source terminal of an OLED selection TFT 512 is connected to a DAC 400 corresponding to a light emitting block 402 to which the OLED selection TFT 512 belongs. Gate terminals of the OLED selection TFTs 512 are connected to OLED selection shift registers 511. Each drain terminal of the OLED selection TFTs 512 is connected to a terminal of the capacitors 521.

According to these connections, when an OLED selection shift register 511 turns on an OLED selection TFT 512, voltage is applied to a capacitor 521 according to an output signal of a DAC 400. The capacitors 521 continue to hold an applied voltage for a hold period.

Anode terminals of the OLEDs 201 are connected to drain terminals of the OLED drive TFTs 522. Cathode terminals of the OLEDs 201 are connected to a constant-voltage source Voled via power supply wiring 533. The OLEDs 201 are current driven light emitting elements, and either emit a light amount according to an amount of drive current supplied from the OLED drive TFTs 522 or do not emit light. As described above, drive current amounts correspond to a held voltages of the capacitors 521, and held voltages of the capacitors 521 correspond to output signals of the DACs 400, and therefore the OLEDs 201 emit light amounts corresponding to output signals of the DACs 400.

Source terminals of the Vsd detection TFTs 523 are connected to drain terminals of the OLED drive TFTs 522 and anode terminals of the OLEDs 201. Gate terminals of the Vsd detection TFTs 523 are connected to a Vsd detection shift register 550. Drain terminals of the Vsd detection TFTs 523 are connected to a Vsd detection analogue to digital converter (ADC) 501 of the drive IC 302. When the Vsd detection shift register 550 turns on a Vsd detection TFT 523, a corresponding drain voltage Vd of an OLED drive TFT 522 of a light emitting block 402 is inputted to a Vsd detection ADC 501.

The light emission pixel circuits 520 receive pixel signals from the DACs 400 by the OLED selection shift registers 511 switching on the OLED selection TFTs 512 one by one in order. In a main scanning period, a period in which a pixel signal received from a DAC 400 is called a sample period, and a period in which a received image signal is held via a capacitor 521 is called a hold period.

According to selection operations of the OLED selection shift registers 511, the 100 light emission pixel circuits 520 of a light emitting block 402 each have a sample period offset from each other in a main scanning period, so that a rolling drive is executed.

(2-3-1-3) Reset Circuit 540

The reset circuit 540 includes 150 reset TFTs 541 corresponding one-to-one with the 150 DACs 400. Source terminals of the reset TFTs 541 are connected to a reset power source Vrst. Reset signals RST are inputted via gate terminals of the reset TFTs 541. Further, drain terminals of the reset TFTs 541 are connected to wiring that extends from corresponding DACs 400 to source terminals of the OLED selection TFTs 512.

When a reset TFT 541 is turned on by a reset signal RST, wiring from a corresponding DAC 400 to a source terminal of an OLED selection TFT 512 is initialized to a reset voltage Vrst. The reset voltage Vrst may be the same potential as the constant-voltage source Vpwr and may be the same potential as the constant-voltage source Voled. Further, the reset voltage Vrst may be an intermediate potential between the constant-voltage source Vpwr and the constant-voltage source Voled. The reset circuit 540 may be included in the drive IC 302.

Instead of providing the reset circuit 540, resetting may be performed by switching polarity of DAC 400 output voltage.

As described above, the optical print head 100 controls gate-source voltage Vgs, which is a control voltage of the OLED drive TFTs 522, by inputting pixel signals from the DACs 400 to the light emission pixel circuits 520, which controls light amount of the OLEDs 201.

(2-3-2) Circuit Configuration for Detecting Source-Drain Voltage Vsd

The following describes circuit configuration for detecting source-drain voltage Vsd, which is output voltage of the OLED drive TFTs 522.

When a pulse signal is inputted as a start signal START, the Vsd detection shift register 550 performs a shift register operation synchronized to a clock signal CLK and image data to turn on the Vsd detection TFTs 523 of each of the light emission pixel circuits 520 causing the OLEDs 201 to emit light, in order one by one. As a result, drain voltage Vd of the OLED drive TFTs 522 at the time of light emission of OLEDs 201 of light emission pixel circuits 520 turned on by the Vsd detection TFTs 523 is inputted by the Vsd detection ADC 501 and converted into a digital value.

Reduction of light emission efficiency due to age deterioration of the OLEDs 201 is such that light amount correction is unnecessary even when an OLED 201 is caused to emit light continuously for 10 hours, and when a solid image is formed, concentration unevenness due to light amount changes is insufficient for visual recognition. Accordingly, a decrease in light emission efficiency of the OLEDs 201 while detecting each source-drain voltage Vsd for all 15,000 OLEDs 201 according to the Vsd detection shift register 550 can be ignored, and therefore a driver IC according to at least one embodiment is provided with only one of the Vsd detection ADC 501.

However, in a case in which reduction in light emission efficiency of the OLEDs 201 due to an increase in cumulative light emission time cannot be ignored, or in a case of detecting the source-drain voltage Vsd with high accuracy, a plurality of Vsd detection ADCs 501 may be provided and the number of OLEDs 201 under each of the Vsd detection ADCs 501 may be decreased. Further, the number of the Vsd detection ADCs 501 may be determined through consideration of wiring length and wiring impedance from the OLED drive TFTs 522 to the Vsd detection ADCs 501.

A latch circuit 502 holds a digital value of drain voltage Vd outputted from the Vsd detection ADC 501 as a source-drain voltage Vsd, in synchronization with the clock signal CLK and the image data. Thus, it is possible to reliably latch source-drain voltage Vsd at a timing when an OLED 201 is emitting light. As described later, the latch circuit 502 also latches output of a noise detection ADC 500.

In a sample period of the main scanning period, the image signal is being written from the DACs 400 to the capacitors 521, and the source-drain voltage Vsd of the OLED drive TFTs 522 is not stable. Thus, a sample period is inappropriate as a period for detecting source-drain voltage Vsd, and source-drain voltage Vsd is preferably detected during a hold period.

In each of the light emitting blocks 402, start times of hold periods of each of the light emission pixel circuits 520 are different, and therefore in order to detect source-drain voltage Vsd in a hold period, the latch circuit 502 may be provided with a delay circuit or the like for waiting without latching during a sample period. In this way, it is possible to reliably latch source-drain voltage Vsd during a hold period. A latched gate-source voltage Vgs is stored by an ASIC 310 of the controller 101.

As another method, the Vsd detection ADC 501, in addition to drain voltage Vd of the OLED drive TFTs 522 supplying drive current to light emitting OLEDs, may calculate source-drain voltage Vsd according to a digitized value of power source voltage Vpwr inputted to the Vsd detection ADC 501.

Further, a detection shift register 420 performs a shift register operation synchronized with the clock signal CLK and image data to determine whether OLED 201 drive current for causing the OLEDs 201 to emit light is supplied to the OLED drive TFTs 522, which are a detection target of source-drain voltage Vsd, referencing image data, in order to detect source-drain voltage Vsd during drive current supply.

Whether or not an OLED 201 is caused to emit light depends on image data, and therefore in a case of an OLED 201 that does not emit light for even multiple main scans, the source-drain voltage Vsd of the OLED drive TFT 522 pertaining to the OLED 201 cannot be detected, and the source-drain voltage Vsd of other OLED drive TFTs 522 cannot be detected.

Thus, if the number of consecutive determinations reaches a predefined number for which an OLED 201 does not emit light, referencing image data for one pixel, detection of source-drain voltage Vsd pertaining to the pixel is skipped and source-drain voltage Vsd pertaining to the next pixel may be detected. Thus, it is possible to prevent a problem of source-drain voltage Vsd being undetectable over an extended period of time.

(2-3-3) Circuit Configuration for Detecting Noise Component

The following describes circuit configuration for detecting a noise component superimposed on a luminance signal due to high frequency noise.

According to at least one embodiment, a noise component is detected superimposed on writing wiring 530 corresponding to an n-th DAC 400 among the 150 DACs 400. Thus, the writing wiring 530 extends from the n-th DAC 400. Source terminals of the 100 of the selection TFTs 512 of the n-th selection circuits 401 are each connected to the writing wiring 530 by branch wiring.

A lead-out line 531 is also connected to a connection point 530p between the branch wiring closest to the n-th DAC 400 and the writing wiring 530. An end of the lead-out line 531 is connected to the noise detection ADC 500. The noise detection ADC 500 detects a luminance signal written to the sample hold circuit (capacitor 521) by the DAC 400 and converts the luminance signal to a digital value.

The latch circuit 502 synchronizes to the clock signal CLK and the image data, and holds output voltage of the noise detection ADC 500 in a continuous image region.

In order to increase noise detection sensitivity, the lead-out line 531 is designed to have a lower line impedance than the writing wiring 530. For example, line impedance can be made lower by increasing width of a wiring pattern. When line impedance of the lead-out line 531 is low, even if an induced current is generated by high frequency noise, a voltage drop (noise voltage) caused by the induced current can be reduced. Further, the connection point of the lead-out line 531 is of course not limited to the connection point 530p, and the lead-out line 531 may be connected to the writing wiring 530 at a point other than the connection point 530p.

The noise detection ADC 500 may be provided in plurality, corresponding one to one with the DACs 400.

[3] Operation of OLED Panel 200

The OLED panel 200 uses an active drive system in which for each of the light emitting blocks 402, 100 of the OLEDs 201 share one of the DACs 400 and according to selection circuits 401 luminance signals are written from DACs to the capacitors 521 while sequentially switching the light emission pixel circuits 520. A luminance signal written to one of the capacitors 521 is held until subsequent writing is executed after a main scanning period (1 H period) elapses. The OLEDs 201 each continuously emit light at a light amount according to a luminance signal for approximately a 1 H period.

Figure 6:
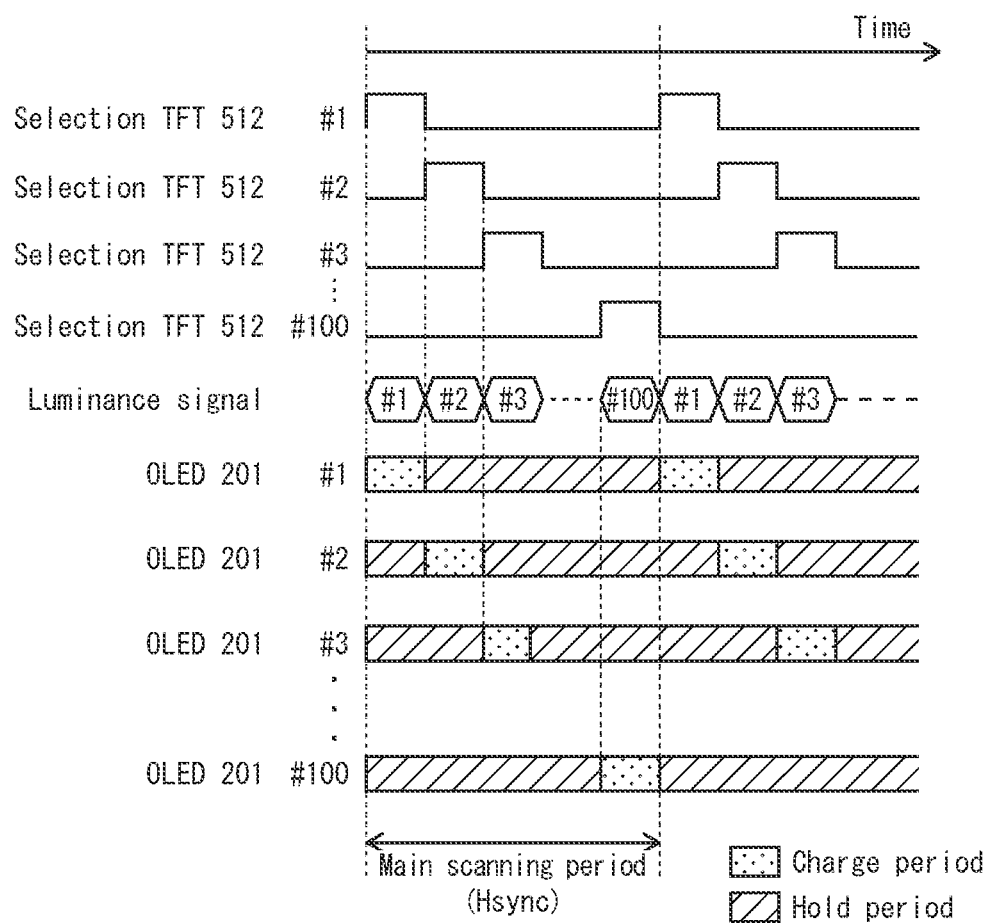
FIG. 6 is a timing chart for describing operation of TFT substrate 300.

In FIG. 6, when a shift register 511 turns on a first selection TFT 512, a luminance signal from a DAC 400 is inputted to a first capacitor 521, an "on" period corresponding to a charge period.

Next, when the shift register 511 turns off the first selection TFT 512, drive current corresponding to the voltage held by the first capacitor 521 is supplied to a first OLED 201 and the first OLED 201 is lit (hold period).

As the first selection TFT 512 turns off, a second selection TFT 512 is turned on, and a luminance signal is inputted to a second capacitor 521. When such operation is executed up to a 100th selection TFT 512, the operation described above is repeated, returning to the first selection TFT 512.

By use of such an active driving system, circuit scale of the OLED panel 200 can be reduced.

[4] ASIC 306

Figure 7:
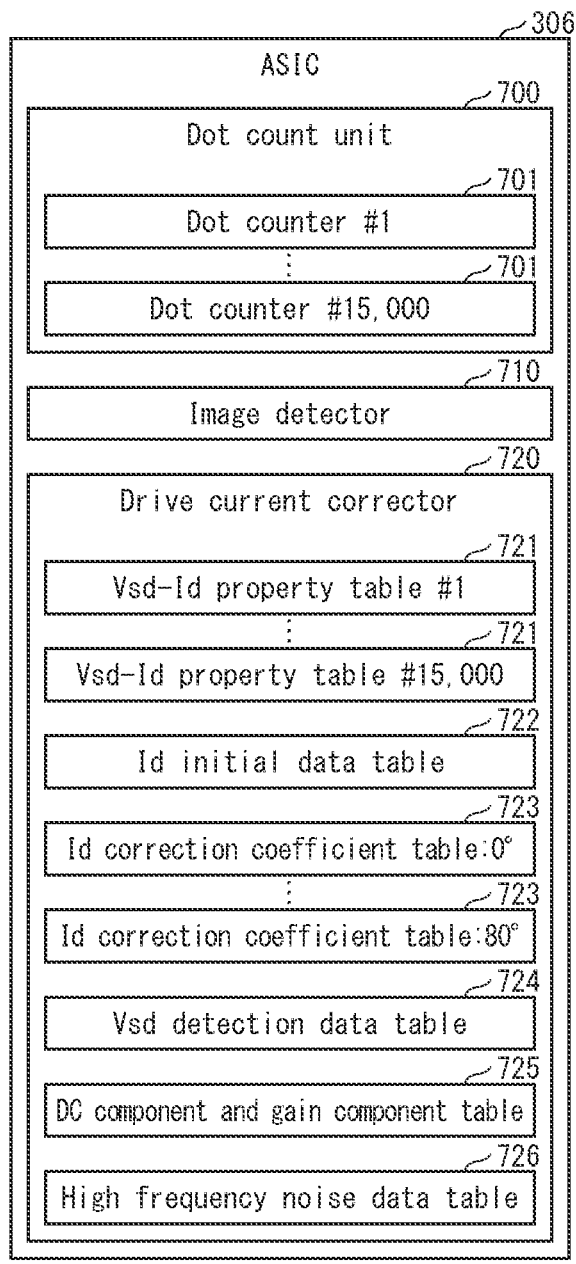
FIG. 7 is a block diagram illustrating main functions of ASIC 306.

The following describes the ASIC 306 included in the controller 101 of the image forming device 1. In FIG. 7, the ASIC 306 includes a dot count unit 700, an image detector 710, and a drive current corrector 720.

(4-1) Dot Count Unit 700

The dot count unit 700 includes dot counters 701 corresponding one to one with the 15,000 OLEDs 201. Counts of the dot counters 701 increase by one each time a corresponding one of the OLEDs 201 emits light.

(4-2) Image Detector 710

The image detector 710 detects a region where at least a predefined number of pixels of image data are on or off in the main scanning direction (hereinafter also referred to as "continuous region") in an image region carried by the light emitting block 402 under the DAC 400 corresponding to the noise detection ADC 500. The predefined number of pixels is a number of pixels for which time required for a DAC 400 to write a luminance signal, that is, number of pixels multiplied by sample time, is greater than time required for analogue to digital (AD) conversion of the luminance signal by the noise detection ADC 500.

When a DAC 400 switches between on and off image data prior to the noise detection ADC 500 completing AD conversion, a luminance signal inputted to the noise detection ADC 500 (bias component) fluctuates, and therefore a noise component excluding the bias component cannot be extracted from the AD converted value. On the other hand, as long as the noise detection ADC 500 performs AD conversion on input voltage in a region detected by the image detector 710, bias component fluctuation can be avoided.

Figure 8:
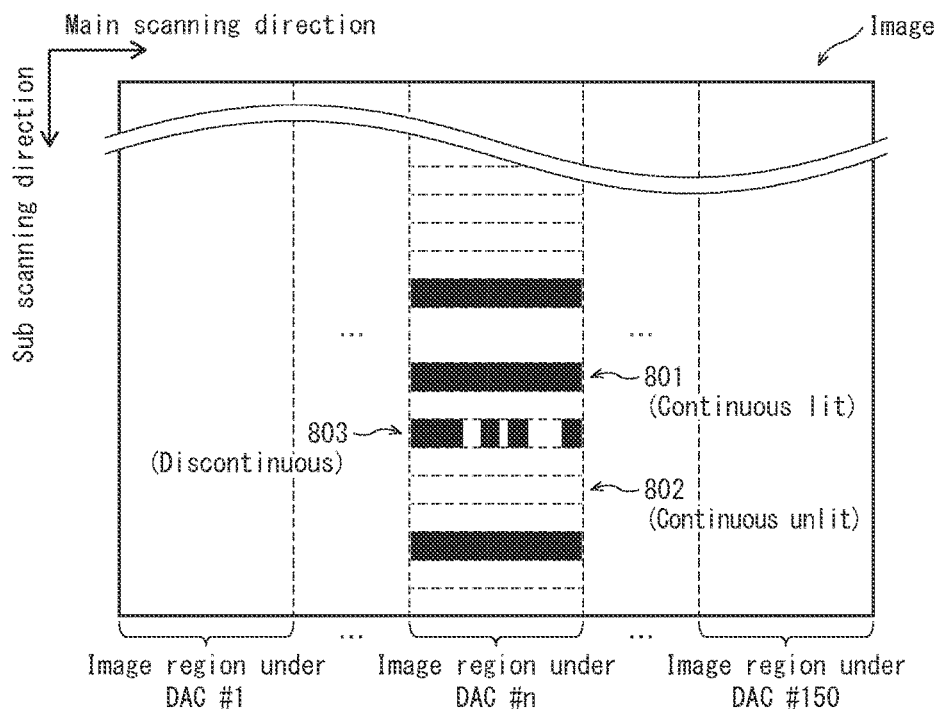
FIG. 8 shows an example of image data, focusing on an image region under an nth DAC.

FIG. 8 shows an example of image data, in which lit pixels are represented by black and unlit pixels are represented by white. When the noise detection ADC 500 is provided corresponding to the n-th DAC 400 and the predefined number of pixels is 100 pixels (corresponding to one light emitting block 402), the image detector 710 determines that an image region 801 is a continuous region in which lit pixels are continuous and that an image region 802 is a continuous region in which unlit pixels are continuous. Further, an image region 803 is determined to be a discontinuous region that is not composed of either continuous lit pixels or continuous unlit pixels.

When the time required for the noise detection ADC 500 to complete AD conversion is 10 pixels, the image detector 710 can determine that the image region is a continuous region by referring to the first pixel to the tenth pixel in the image region 801. Further, in this case, as long as the image region 803 includes a region in which 10 pixels are continuously lit or unlit, the image detector 710 detects the region as a continuous region.

The noise detection ADC 500 performs AD conversion of a luminance signal during a period when a DAC 400 outputs the luminance signal of an OLED 201 exposing a continuous region detected by the image detector 710.

(4-3) Drive Current Corrector 720

When an OLED 201 itself degrades with time or a luminance signal fluctuates due to the influence of high frequency noise, an amount of light emission of the OLED 201 varies. The drive current corrector 720 suppresses variation in light emission amount by correcting drive current supplied to the OLEDs 201. The drive current corrector 720 includes a Vsd-Id property table 721 for each of the drive TFTs 512, an Id initial data table 722 that stores an initial drive current amount corresponding to a set light amount for each of the OLEDs 201, an Id correction coefficient table 723 of ambient temperature, cumulative light emission time, and set light amount as parameters of the OLEDs 201, and a Vsd detection data table 724.

[5] Correction of Light Amount Variation Due to Causes Such as Deterioration Over Time The following describes a process of correcting a drive current amount Id of an OLED 201 in order to suppress variation in light emission amount caused by deterioration over time of the OLED 201.

The OLED 201 deteriorates as cumulative light emission time increases, and deteriorates faster when emitting high luminance light (large light emission amount). Further, the OLED 201 deteriorates faster in higher ambient temperature. Thus, as long as drive current Id is adjusted according to cumulative light emission time, set light amount, and ambient temperature, variation in light emission amount of the OLED 201 can be adjusted.

However, when the drive current Id is supplied to the OLED 201, a voltage drop (forward voltage Vel) is generated between the anode terminal and the cathode terminal of the OLED 201. Size of the forward voltage Vel varies according to the drive current Id supplied. On the other hand, power source voltages Vpwr and Voled do not vary, and therefore voltage across a series circuit connected to the drain terminal of the drive TFT 512 and the anode terminal of the OLED 201 is constant. When variation in the drive current Id causes variation in the forward voltage Vel of the OLED 201, the source-drain voltage Vsd of the drive TFT 512 varies.

Figure 9:
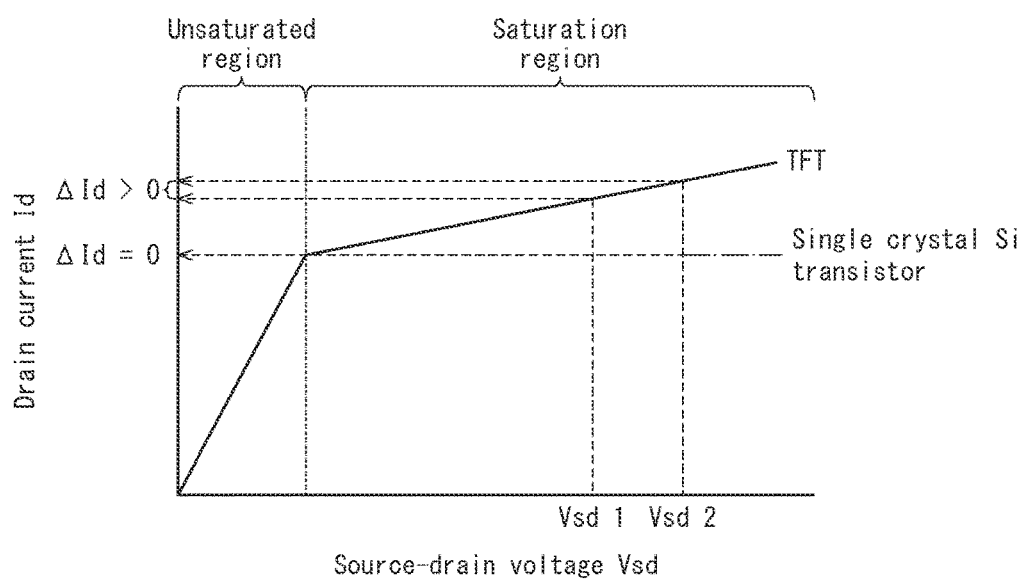
FIG. 9 shows Vsd-Id properties of TFT.

In FIG. 9, the TFT has a Vsd-Id property in which even in a saturation region, drain current Id varies in accordance with source-drain voltage Vsd. Thus, when forward voltage Vel varies due to adjustment of drive current Id supplied to the OLED 201, and source-drain voltage Vsd of the drive TFT 512 varies, drain current (drive current) Id varies, and therefore a target light emission amount cannot be achieved.

To counter this problem, according to at least one embodiment, gate-source voltage Vgs is determined with reference to the Vsd-Id property table 721 for each of the drive TFTs 512.

Figure 10:
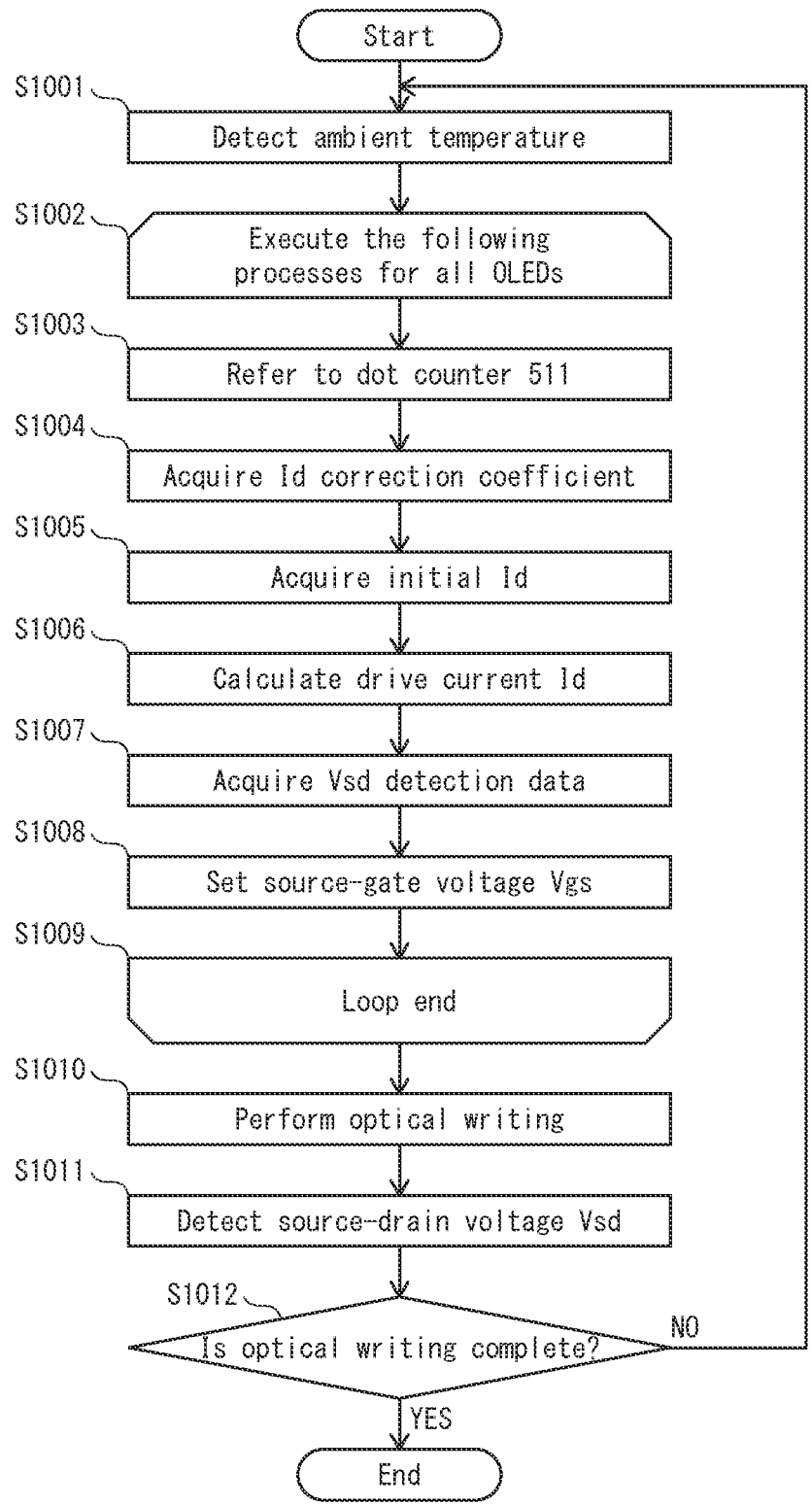

More specifically, in FIG. 10, first, the temperature sensor 303 detects ambient temperature of the OLEDs 201 (S1001). Next, steps S1002 to S1009 are executed in a loop for all 15,000 of the OLEDs 201.

In the loop, for each of the OLEDs 201, first, a dot counter 701 corresponding to the OLED 201 is referenced to obtain a cumulative light emission time of the OLED 201 (S1003), further, the Id correction coefficient table 723 is referenced to obtain an Id correction coefficient corresponding to ambient temperature, cumulative light emission time, and set light amount (S1004).

In FIG. 11, the Id correction coefficient table 723 stores an Id correction coefficient for each combination of ambient temperature in a range from 0 degrees Celsius to 80 degrees Celsius, cumulative light emission time, and set light amount from La to Ld. Ambient temperature is obtained by the temperature sensor 303 and cumulative light emission time is obtained from the dot counters 701.

For each of the OLEDs 201, a set light amount of the OLED 201 is set according to positions of the OLED 201 and the rod-lens array 230 relative to each other and image forming speed. For example, time required for thermal fixing of a toner image to a recording sheet S varies depending on whether the recording sheet S supplied to the image former is plain paper or thick paper, and therefore image forming speed is switched accordingly. When image forming speed is fast, exposure time is short, and therefore the set light amount of the OLED 201 is large, and when image forming speed is slow, exposure time is long, and therefore the set light amount of the OLED 201 is small.

Next, referring to the Id initial data table 722, an initial drive current amount Id (hereinafter also referred to as "initial Id") of the OLED 201 is acquired (S1005). In FIG. 12, the Id initial data table 722 is a table in which set light amounts from La to Ld for each of the 15,000 OLEDs 201 are associated with an initial Id. The drive current amount Id is calculated as shown in Equation (1), using the initial Id (S1006).

(drive current amount Id)=(Id correction coefficient)×(initial Id)   (1)

Thus, it is possible to obtain the drive current amount Id for causing the OLED 201 to emit light at the set light amount.

Figures 13, 14:
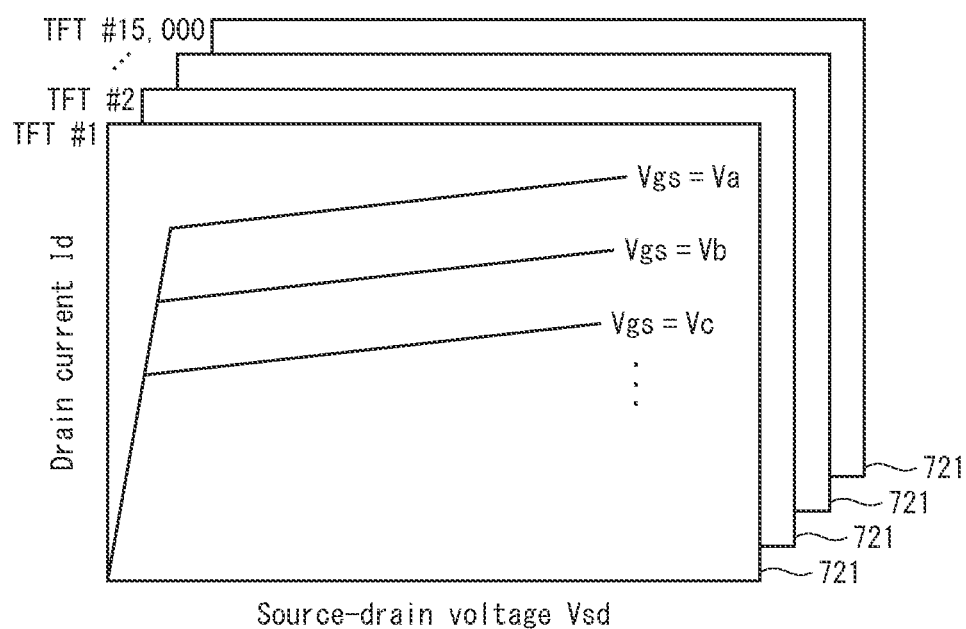
FIG. 13 shows a table describing data structure of Vsd detection data table 724.
FIG. 14 shows graphs describing data structure of Vsd-Id property table 721.

Next, referring to the Vsd detection data table 724, detection data of the source-drain voltage Vsd is acquired (S1007). In FIG. 13, the Vsd detection data table 724 is a table storing digital data of source-drain voltage Vsd latched by the latch circuit 502 for each of the OLED drive TFTs 522. The Vsd detection data table 724 is rewritten to the latest data each time the latch circuit 502 latches a digital value of the source-drain voltage Vsd.

Further, referring to the Vsd-Id property table 721 of the OLED drive TFT 522 supplying a drive current Id to the OLED 201, a gate-source voltage Vgs is determined that corresponds to a combination of drive current Id calculated by using Equation (1) and detected data of a latest source-drain voltage Vsd (S1008).

In FIG. 14, the Vsd-Id property tables 721 store relationships between source-drain voltage Vsd and drain current Id for each gate-source voltage Vgs, as Vsd-Id properties for each of the OLED drive TFTs 522.

Figure 15A:
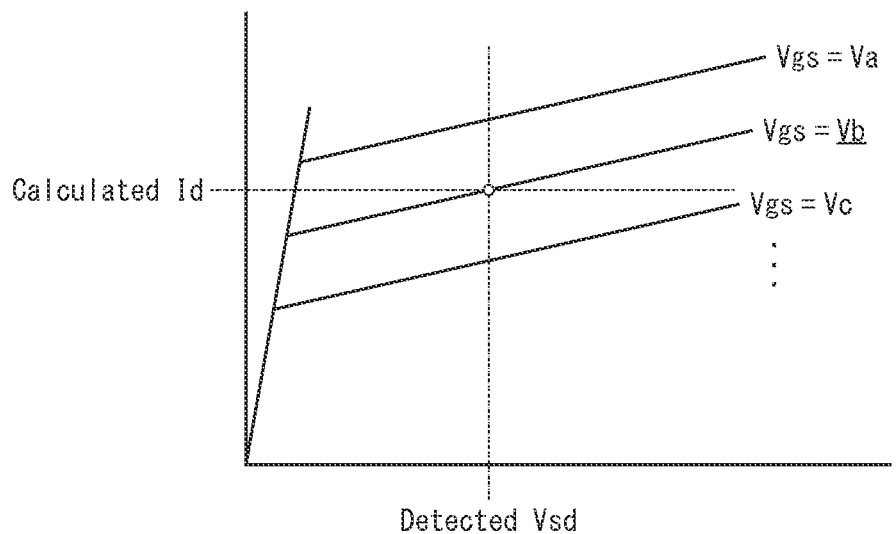
FIG. 15A is a graph illustrating a case in which voltage Vb is found as gate-source voltage Vgs corresponding to a combination of calculated drive current Id and detected source-drain voltage Vsd.

Referring to the Vsd-Id property table 721 of the OLED drive TFT 522, an example of which is shown in FIG. 15A, when a voltage Vb is found as a gate-source voltage Vgs corresponding to a combination of a calculated drive current Id and a detected source-drain voltage Vsd, the voltage Vb is applied as a gate-source voltage Vgs.

Figure 15B:
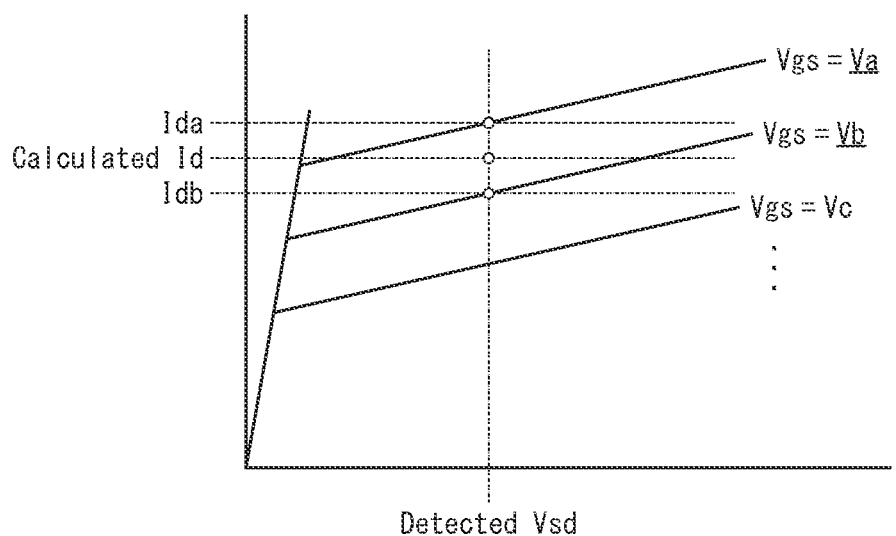
FIG. 15B is a graph illustrating a case in which gate-source voltage Vgs corresponding to Vsd-Id property table 721 does not exist.

Further, when a gate-source voltage Vgs corresponding to the Vsd-Id property table 721 is not found, linear interpolation may be performed by using a nearest gate-source voltage Vgs. In the example shown in FIG. 15B, when the nearest gate-source voltage Vgs is Va and Vb, a gate-source voltage Vgs is set by linear interpolation by using drain current Ida and drain current Idb, corresponding to a combination of source-drain voltage Vsd and source-gate voltage Va and a combination of source-drain voltage Vsd and source-gate voltage Vb, respectively. More specifically:

Vgs={(Id−Idb)×Va+(Ida−Id)×Vb}/(Ida−Idb)   (2)

Upon completion of the loop from step S1002 to step S1009, optical writing is performed by outputting an image signal from the DACs 400 so that the held voltages of the capacitors 521 becomes equal to the gate-source voltages Vgs set as above. Further, source-drain voltages Vsd are calculated in parallel (S1011). As a result, source-drain voltages Vsd of the Vsd detection data table 724 are rewritten to the latest data. Subsequently, when optical writing is complete (S1012: YES), processing is complete.

In this way, it is possible to suppress variations in light amount caused by shifts in source-drain voltage Vsd in a saturation region of the OLED drive TFTs 522 and by variation in forward voltage Vel of the OLEDs 201.

[6] Correction of Light Amount Variation Caused by High Frequency Noise

The following describes processing for suppressing light amount variation caused by high frequency noise.

High frequency noise generated by the charging device and the developer device is steady cyclic noise. Cyclic noise generates streaky noise in printed images, due to concentration unevenness. Suppressing concentration unevenness to less than 1% is sufficient to prevent such streaky noise from being visually recognized. Light emission amount of the OLED 201 increases and decreases according to the phase of high frequency noise, and therefore if the phase of high frequency noise is detected and drive current amount is increased or decreased, it is possible to suppress fluctuation in light amount caused by high frequency noise. Accordingly, it is possible to suppress concentration unevenness in a printed image to less than 1% so that streaky noise cannot be visually recognized.

According to at least one embodiment, a noise component due to high frequency noise is detected superimposed at the writing wiring 530, and luminance signals outputted from the DACs 400 are corrected in advance by amounts corresponding to the noise component. In this way, the OLEDs 201 can emit light with a target light amount by superimposing the noise component on the luminance signal, and therefore concentration unevenness caused by high frequency noise can be suppressed.

Figures 16, 17:
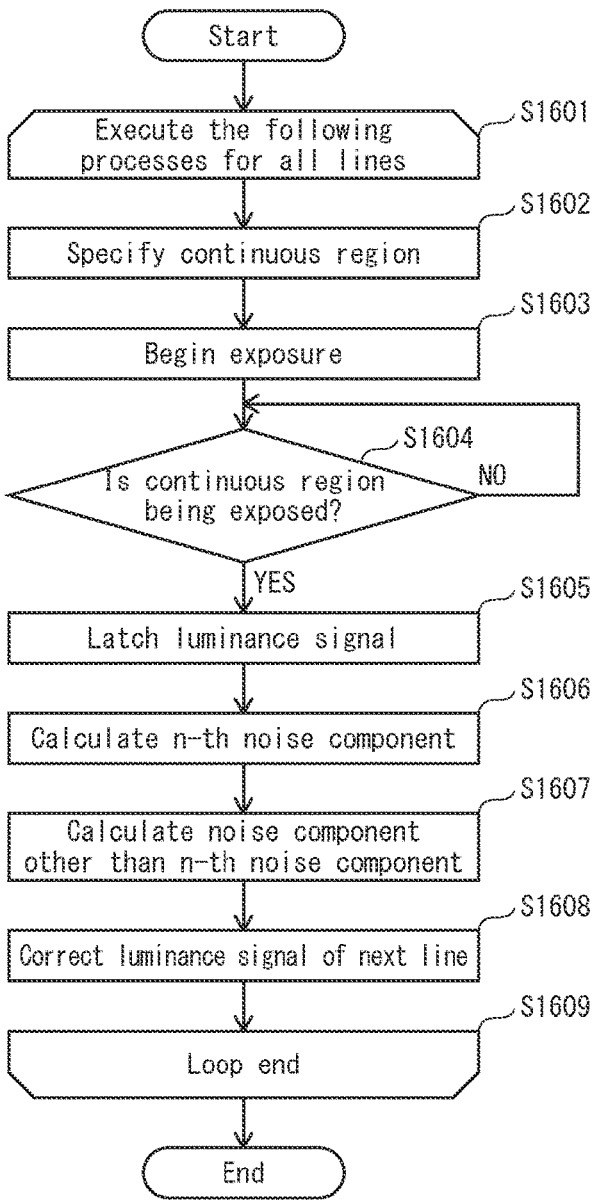
FIG. 16 is a flowchart describing a luminance signal correction operation to counter high frequency noise.
FIG. 17 shows a table describing data structure of DC component and gain component table 725.

When correcting light amount variation caused by high frequency noise, a process from step S1602 to S1608 is executed for each line of an image, as illustrated in FIG. 16 (S1601, S1609). First, the image detector 710 analyzes the line of the image data and specifies a continuous region in an image region to be exposed by the n-th light emission pixel circuit 520 (S1602). Subsequently, exposure is started (S1603), and when the continuous region is exposed (S1604: YES), the latch circuit 502 holds a luminance signal digitized by the noise detection ADC 500 (S1605).

The controller 101 can reference the luminance signal held by the latch circuit 502.

The controller 101 subtracts input value (digital value) Vdac of the n-th DAC 400 from detection value Vdetect outputted by the noise detection ADC 500, in order to calculate a noise component Ax of the n-th light emission pixel circuit 520 (hereinafter also referred to as "n-th noise component Ax") (S1606).

$$Ax = V\text{detect} - V\text{dac} \quad (3)$$

Size of a noise component caused by high frequency noise varies for each of the DACs 400. Thus, in order to correct drive current Id supplied to the OLEDs 201 under the DACs 400 other than the n-th DAC 400, noise components Ax other than the n-th noise component Ax are sought from the n-th noise component Ax (S1607).

More specifically, when an m-th noise component Ax_m is sought, referring to the DC component and gain component table 725 as illustrated in FIG. 17, an n-th DC component DCn is subtracted from the n-th noise component Ax, and the result is multiplied by the m-th gain component Gainm. Further, the result is added to the m-th DC component DCm, as shown in Equation (4), below.

$$Ax\_m = (Ax - DCn) \times \text{Gain}m + DCm \quad (4)$$

By using Equation (4), Ax_m can be calculated from 1 to (n−1) and (n+1) to 150.

In the next line of image data, in order to output a luminance signal to an m-th light emission pixel circuit 520, an input value Vi_m inputted by an m-th DAC 400 is determined taking into consideration deterioration over time as described above, but the m-th noise component Ax_m is predicted to be superimposed, and therefore in order to offset the superimposed noise component Ax_m, the input value Vi_m of the DAC 400 is corrected (S1608).

$$Vdac\_m = Vi\_m - Ax\_m \quad (5)$$

The luminance signal outputted by the DAC 400 in the next line of image data is corrected in advance only with respect to the noise component, and therefore as the noise component is superimposed on the luminance signal, a target gate-source voltage Vgs is held in the capacitor 521. Accordingly, light amount variation of the OLEDs 201 caused by high frequency noise is suppressed, and therefore high printing image quality can be achieved.

[7] Modifications

Above, the present invention is described based on at least one embodiment, but the present invention is of course not limited to the at least embodiment above, and the following modifications of the present invention may be implemented.
(7-1) According to at least one embodiment, the noise detection ADC 500 detects source voltages of the selection TFTs 512, but the present invention is of course not limited to this, and gate voltages of the drive TFTs 512 may be detected as an alternative. This configuration also achieves the effects of the present invention.
(7-2) According to at least one embodiment, AD conversion of a luminance signal at the noise detection ADC 500 in a continuous region of image data is described, but the present invention is of course not limited to this. For example, in a case in which the noise detection ADC 500 can complete AD conversion of a luminance signal in one sample period, detecting a continuous region is not necessary. When AD conversion of a luminance in any sample period is possible, the noise component Ax can be calculated and the luminance signal can be corrected.
(7-3) According to at least one embodiment, correcting a next line of a luminance signal by using an unadjusted noise component detected in a preceding line of image data is described, but the present invention is of course not limited to this.

The noise component Ax caused by high frequency noise varies cyclically. In a case in which a cycle of the noise component Ax is long, variation of the noise component between adjacent lines in the sub-scanning direction of image data is small. Thus, as in at least one embodiment described above, the noise component Ax detected in a preceding line can be used unadjusted for correction of the luminance signal of the next line.

However, when concentration unevenness of a printed image exceeds 1%, streaky noises can be visually recognized. Thus, when a cycle of the noise component Ax is short and variation of the noise component Ax between adjacent lines is large, and the noise component Ax detected in a preceding line is used unadjusted for correction of the luminance signal of the next line, there is a risk that concentration unevenness caused by high frequency noise cannot be suppressed to less than 1%.

Further, for example, when a line continues in which lit and unlit states of OLEDs 201 frequently switch in the sub-scanning direction, such as in a QR code (registered trademark), there may be no continuous region, and therefore lines in which the noise component Ax cannot be detected may be consecutive. In such a case, there is a risk of concentration unevenness exceeding 1% even if a luminance signal is corrected by using the last detected noise component Ax.

The following describes a solution to such a problem. Cycle and amplitude of high frequency noise generated by the charging device 112 and the developer device 113 are constant, and therefore cycle and amplitude of the noise component Ax are also constant. Cycle and amplitude of the noise component Ax can be known in advance if measured at the time of factory shipment, for example. Accordingly, in the high frequency noise data table 726 shown in FIG. 18, high frequency noise data corresponding to noise component Ax values for each phase of the noise component Ax can be stored in advance in the ASIC 306.

Accordingly, in image formation, phase of the noise component Ax can be estimated to certain degree of accuracy from elapsed time since the start of the charging device 112 and the developer device 113 and the cycle of the noise component Ax. Thus, when a luminance signal is corrected by predicting phase of the noise component Ax in exposure timing, concentration unevenness can be accurately suppressed. However, there is a risk of error in an estimated phase Pa of the noise component Ax. The following describes correcting such error.

First, phase of the noise component Ax is classified into four period types. In FIG. 19, a period #1 is a period in which the noise component Ax monotonically decreases in a range of detection error B of phase of the noise component Ax (hereinafter also referred to as "phase error B"). More specifically, in this example the range of phase error B is included in a range from 90° to 270°.

Period #2 is a period in which the noise component Ax monotonically increases in a range of phase error B. More specifically, in this example the range of phase error B is included in a range from 270° to 90° (450°).

Period #3 is a period which includes a maximum value of the noise component Ax in a range of phase error B. More specifically, in this example the range of phase error B is included in a range from (90−B)° to (90+B)°.

Period #4 is a period which includes a minimum value of the noise component Ax in a range of phase error B. More specifically, in this example the range of phase error B is included in a range from (270−B)° to (270+B)°.

The phase error B is a range of detection error determined from AD conversion speed of the noise detection ADC 500. In the following, a value of the noise component Ax of phase p is expressed as Ax(p).
(7-3-1) Periods #1, #2

The noise component Ax decreases or increases monotonically in the periods #1 and #2, and therefore a value Vi obtained by superimposing the noise component Ax(Pa) of an estimated phase Pa on an input value Vdac of a DAC 400 only coincides at one point in period #1 with a detected value Vdetect of the noise detection ADC 500 of matching phase. Accordingly, whether or not correction of an estimated phase Pa of the noise component Ax is necessary is determined as follows.
(7-3-1-1) When Vi=Vdetect In FIG. 20, the DAC 400 performs digital to analogue (DA) conversion on a luminance signal value Vdac (=Vi−Ax(Pa)) obtained by subtracting the noise component Ax(Pa) of the estimated phase Pa from the luminance signal value Vi, for which age deterioration and the like is taken into consideration, then outputs a result. The noise detection ADC 500 performs AD conversion on a signal for which high frequency noise is superimposed on the DAC 400 output signal, and outputs a signal value Vdetect. The detected signal value Vdetect includes a noise component Ax(P) of actual phase P.

$$Vdetect = Vdac + Ax(P) \tag{6}$$

On the other hand, the luminance signal value Vi is obtained by superimposing the noise component Ax(Pa) of the estimated phase on the input value Vdac of the DAC 400.

$$Vi = Vdac + Ax(Pa) \tag{7}$$

Thus, when the output value Vdetect of the noise detection ADC 500 is equal to the signal value Vi, it is determined that the estimated phase Pa of the noise component Ax matches the actual phase P, and therefore there is no need to correct the estimated phase Pa.

(7-3-1-2) When Vi≠Vdetect

When Vi is not equal to Vdetect, it can be determined from Equation (6) and Equation (7) that:

$$Ax(Pa) > Ax(P) \tag{8}$$

or $$Ax(Pa) < Ax(P) \tag{9}$$

In the case of Formula (8), in period #1 the noise component Ax is monotonically decreasing, and therefore estimated phase Pa of the noise component Ax is behind actual phase P. In period #2 the noise component Ax is monotonically increasing, and therefore estimated phase Pa of the noise component Ax is ahead of actual phase P.

In the case of Formula (9), in contrast to Formula (8), in period #1 estimated phase Pa of the noise component Ax is ahead of actual phase P, and in period #2 estimated phase Pa of the noise component Ax is behind actual phase P.

In each case estimated phase Pa is different from actual phase P, and therefore correction of estimated phase Pa is required. Referring to high frequency noise data table 726, noise component values Ax(x) and Ax(y) closest to actual noise component Ax(P) are specified. In the case of period #1:

$$Ax(x) > Ax(P) > Ax(y) \tag{10}$$

In the case of period #2:

$$Ax(x) < Ax(P) < Ax(y) \tag{11}$$

Thus, phase x is behind actual phase P and phase y is ahead of actual phase P. According to interpolation using these values, estimated phase Pa is updated according to the following equation:

$$Pa = \{x \times (Ax(P) - Ax(y)) + y \times (Ax(x) - Ax(P))\} / (Ax(x) - Ax(y)) \tag{12}$$

By using an updated noise component Ax(Pa) for a line to be exposed after a line for which the signal value Vdetect is detected by the noise detection ADC 500, it is possible to correct exposure unevenness caused by high frequency noise.

If variation of the noise component Ax can be approximated by a sinusoidal waveform of amplitude B, then:

$$Ax(P) = B \times \sin(P) \tag{13}$$

In this case, estimated phase Pa may be updated as follows:

$$Pa = \sin^{-1}(Ax(P)/B) \tag{14}$$

(7-3-2) Periods #3, #4

Figure 21A:
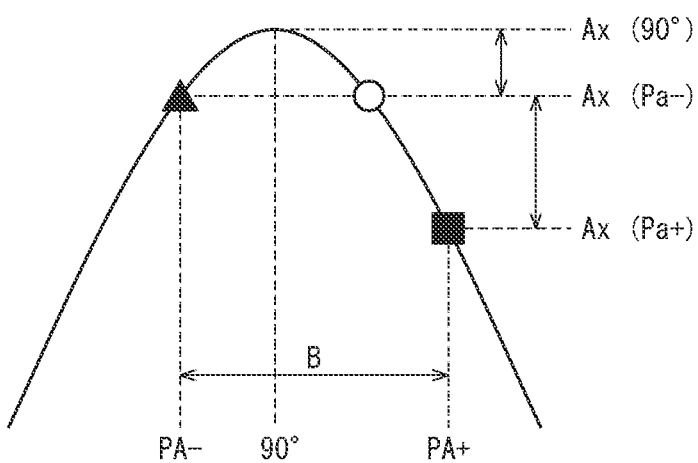
FIG. 21A is a graph illustrating a case in which a range of phase error B in period #3 is from phase Pa− to phase Pa+, including phase 90°.

When a range of phase error B of estimated phase Pa of the noise component Ax is period #3 or period #4, there are two phase values corresponding to detected noise component Ax(P). For example, in FIG. 21A, in period #3, range of phase error B extends over a range from phase Pa− to phase Pa+, including phase 90°. When noise component Ax(P−) is larger than noise component Ax(P+), if detected noise component Ax(P) is equal to or greater than Ax(P−) and less than noise component Ax(90°) when phase is 90°, there are two candidates for actual phase P, and therefore actual phase P cannot be determined.

On the other hand, when detected noise component Ax(P) is equal to or greater than Ax(P+) and less than Ax(P−), there is only one candidate for actual phase P, and therefore it suffices that estimated phase Pa is updated to this phase P.

Figure 21B:
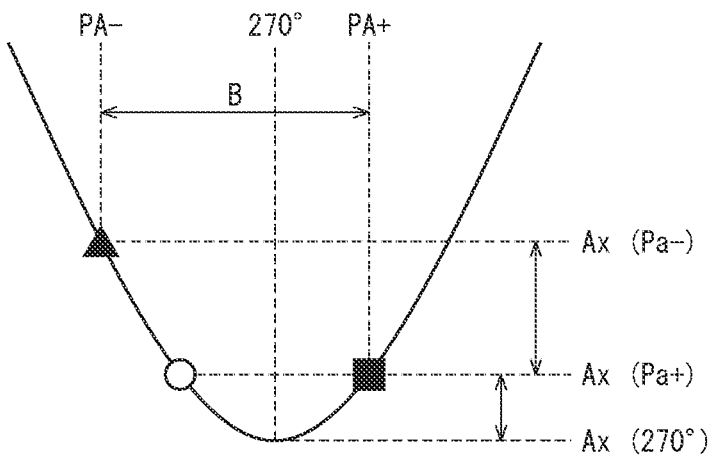
FIG. 21B is a graph illustrating a case in which a range of phase error B is from phase Pa− to phase Pa+, including phase 270°.

In period #4, similarly, in FIG. 21B, range of phase error B extends over a range from phase Pa− to phase Pa+, including phase 270°. When noise component Ax(P+) is smaller than noise component Ax(P−), if detected noise component Ax(P) is equal to or less than Ax(P−) and greater than noise component Ax(270°) when phase is 270°, there are two candidates for actual phase P, and therefore actual phase P cannot be determined.

On the other hand, when detected noise component Ax(P) is greater than Ax(P+) and equal to or less than Ax(P−), there is only one candidate for actual phase P, and therefore it suffices that estimated phase Pa is updated to this phase P.

In consideration of the above, greater or lesser relationships between phases P, P+, P− and noise components Ax(P), Ax(P+), Ax(P−) can be divided into the following seven patterns, and whether or not actual phase P can be determined can be considered.

(a) Ax(P+)>Ax(P)>Ax(P−)
(b) Ax(P+)=Ax(P)>Ax(P−)
(c) Ax(P)>Ax(P+)>Ax(P−)
(d) Ax(P)>Ax(P+)=Ax(P−)
(e) Ax(P)>Ax(P−)>Ax(P+)
(f) Ax(P−)=Ax(P)>Ax(P+)
(g) Ax(P−)>Ax(P)>Ax(P+)

(7-3-2-1) When Actual Phase P Cannot be Determined

Of the seven possibilities above, for (b) to (f) there are two candidates for actual phase P, and therefore actual phase P cannot be determined. Thus, estimated phase Pa cannot be updated by using actual phase P.

(7-3-2-2) When Actual Phase P Can be Determined

Of the seven possibilities above, for (a) and (g) actual phase P can be determined, and therefore estimated phase Pa can be updated by using actual phase P.

(7-3-2-2-1) When Vi=Vdetect

When the output value Vdetect of the noise detection ADC 500 is equal to the signal value Vi, it is determined that the estimated phase Pa of the noise component Ax matches the actual phase P, and therefore there is no need to correct the estimated phase Pa.

(7-3-2-2-2) When Vi≠Vdetect

When the output value Vdetect is not equal to the signal value Vi, estimated phase Pa is different to actual phase P, and therefore estimated phase Pa is corrected as described under (7-3-1-2).

That is, referring to the high frequency noise data table 726, noise component values Ax(x) and Ax(y) closest to actual noise component Ax(P) are specified, and estimated phase Pa is updated as in Equation (12), by using the specified values for interpolation. By updating estimated phase Pa in this way, exposure unevenness caused by high frequency noise can be corrected.

(7-4) According to at least one embodiment, referencing the DC component and gain component table 725 to find m-th noise component Ax_m from n-th noise component Ax is described, but the present invention is of course not limited to this. For example, noise components Ax superimposed on a plurality of writing wiring 530 may be detected, and using these noise components Ax for interpolation calculation, a noise component Ax superimposed on another writing wiring 530 may be calculated.

Figure 22:
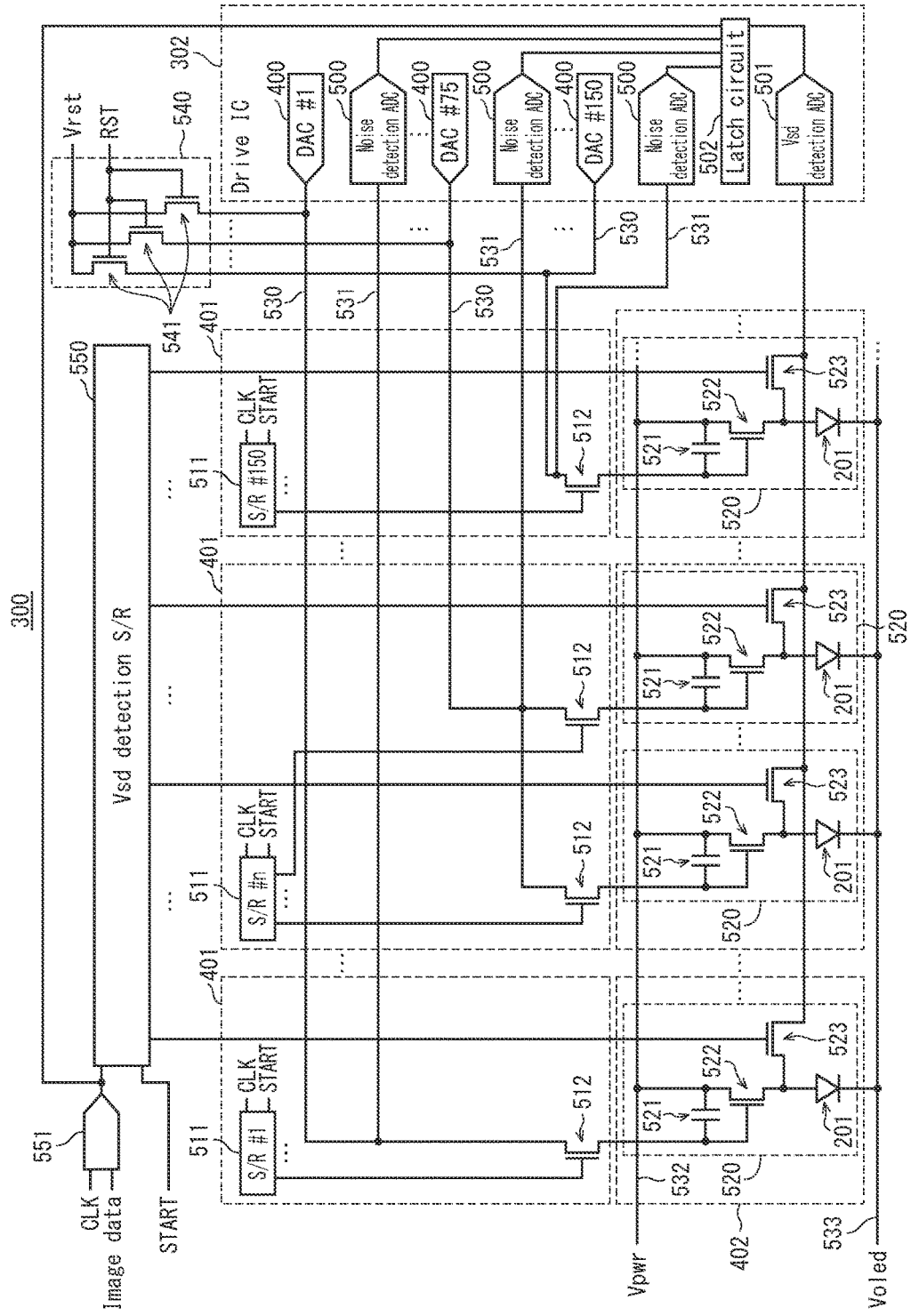
FIG. 22 is a diagram illustrating detail of a schematic circuit configuration of TFT substrate 300 pertaining to a modification.
Figure 23:
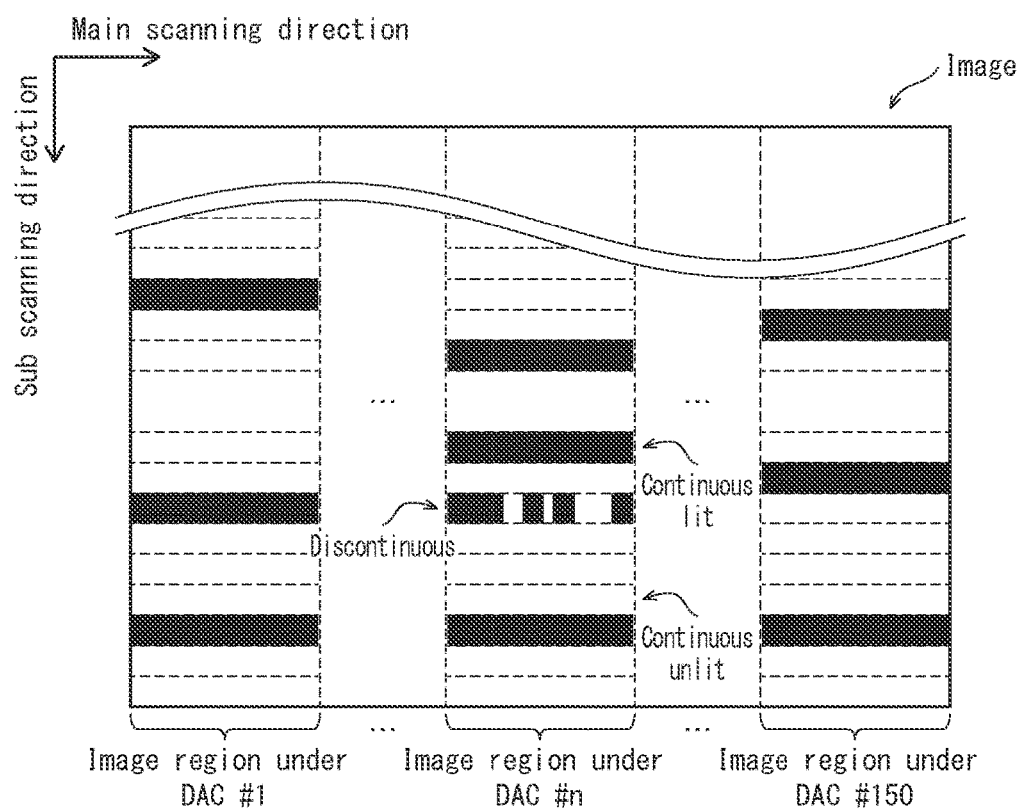
FIG. 23 shows an example of image data, focusing on an image region under multiple DACs.

In FIG. 22, in order to detect noise components Ax_1, Ax_75, Ax_150 superimposed on 1st, 75th, and 150th writing wiring 530, lead-out lines 531 are drawn from the writing wiring 530 and connected to corresponding noise detection ADCs 500. Each of the noise detection ADCs 500 detects a noise component Ax when there is a continuous region in a corresponding image region, as illustrated in FIG. 23.

The high frequency noise data table 726 stored by the ASIC 306 pertaining to the present modification stores a noise component Ax for each phase angle superimposed on the 1st, 75th, and 150th writing wiring, as illustrated in FIG. 24. Phase of high frequency noise is specified using detected noise components Ax_1, Ax_75, Ax_150 and the high frequency noise data table 726.

In a case in which m-th noise component Ax_m is sought, if:

$$1<m<75 \quad (15)$$

then using Equation (16) below, from 1st and 75th noise components Ax_1, Ax_75, m-th noise component Ax_m is calculated.

$$Ax\_m=\{Ax\_1\times(75-m)+Ax\_75\times(m-1)\}/(75-1) \quad (16)$$

Similarly, if:

$$75<m<150 \quad (17)$$

then using Equation (18) below, from 75th and 150th noise components Ax_75, Ax_150, m-th noise component Ax_m is calculated.

$$Ax\_m=\{Ax\_75\times(150-m)+Ax\_150\times(m-75)\}/(150-75) \quad (18)$$

In this way, it is possible to calculate each noise component Ax_m from the 2nd to the 74th and from the 76th to the 149th. Further, according to the present modification, unlike one or more embodiments described above, the DC component and gain component table 725 is not needed to calculate m-th noise component Ax_m. Thus, storage amount of the ASIC 306 can be reduced, which may result in lower costs.

Of course, the combination of the writing wiring 530 for detecting the noise component Ax is not limited to the combination of the 1st, 75th, and 150th, other combinations may be used, and four or more of the writing wiring 530 may be used.

(7-5) According to at least one embodiment, storing the high frequency noise data table 726 in advance as initial data in the ASIC 306 is described, but the present invention is of course not limited to this.

For example, if the high frequency noise table 726 stored in advance as initial data becomes inappropriate due to a change over time of high frequency noise, and input value Vi_m of the DAC 400 is corrected using the high frequency noise data table 726, there is a risk of the noise component Ax not being canceled with high precision. Further, when the high frequency noise data table 726 is stored in advance, costs are incurred for creating and storing the data.

According to the present modification, the high frequency noise data table 726 is created by detecting the noise component Ax at the time of turning on a power source of the image forming device 1, at the time of idling, and between paper sheets. The OLEDs 201 are continuously unlit at the time of turning on the power source, idling, and between sheets, and therefore it is unnecessary to detect a continuous region and the noise component Ax can typically be detected.

In this way, the high frequency noise data table 726 can be updated along with changes to high frequency noise over time, and therefore phase of high frequency noise can be accurately detected. Accordingly, even if high frequency noise changes over time, the input value Vi_m of the DACs 400 can be corrected to accurately cancel the noise component Ax.

(7-6) According to at least one embodiment, detecting the noise component superimposed on the n-th writing wiring 530 is described, but the present invention is of course not limited to this.

According to at least one embodiment, only the noise component Ax superimposed on the n-th writing wiring 530 is detected, and therefore if a situation of no continuous region of an image region corresponding to the n-th DAC 400 continues, phase of high frequency noise cannot be accurately detected.

Figure 25:
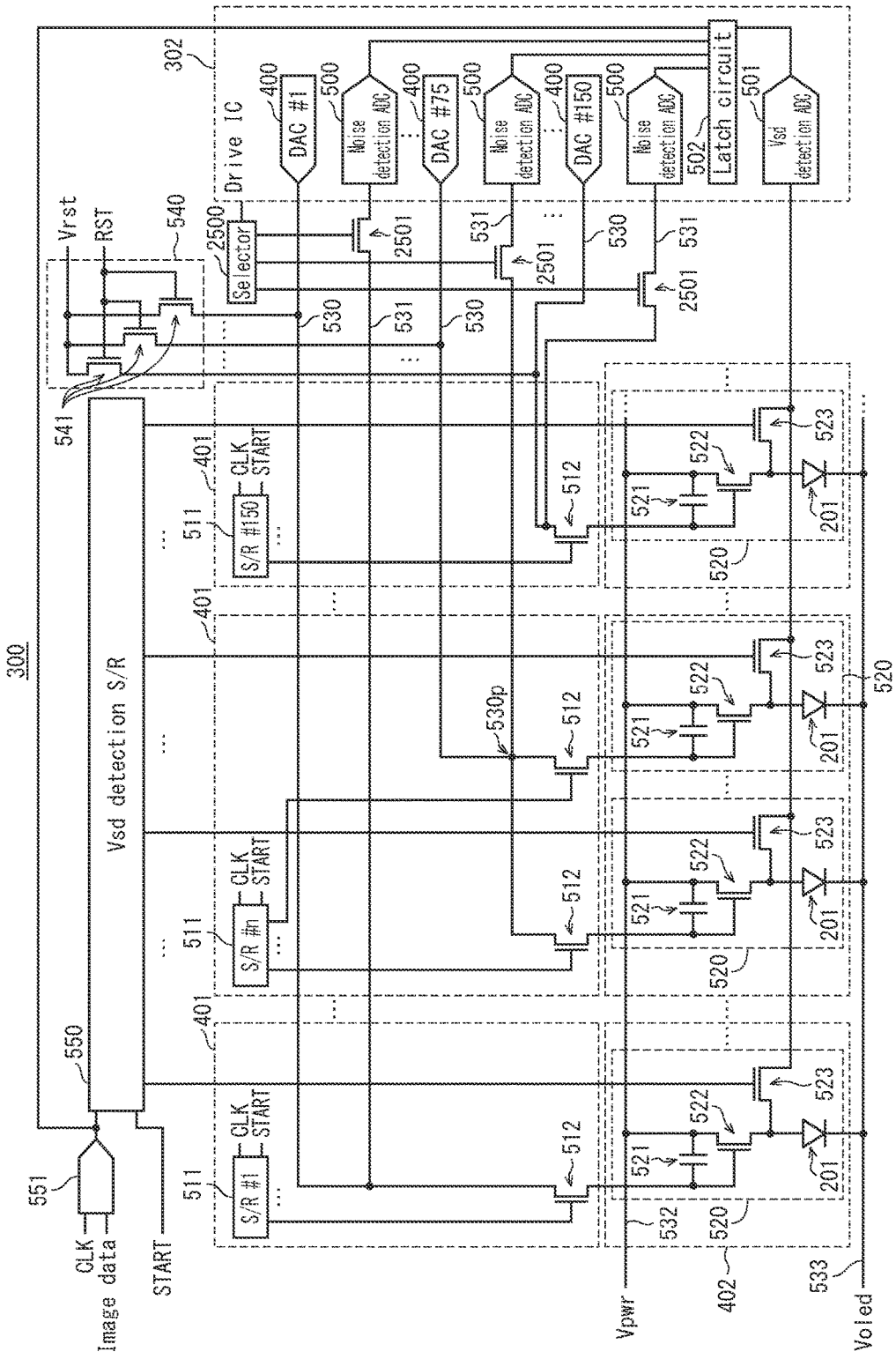
FIG. 25 is a diagram illustrating detail of a schematic circuit configuration of TFT substrate 300 pertaining to a modification.
Figures 26, 27:
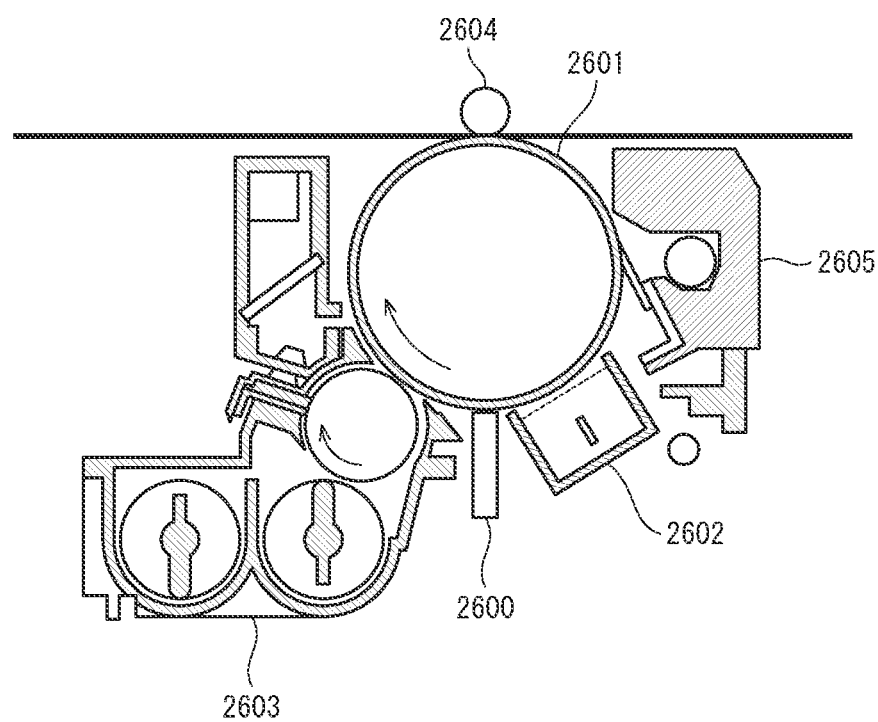
FIG. 26 illustrates configuration of an imaging unit pertaining to prior art.
FIG. 27 is a table in which LPH and OLED-PH properties are organized.
Figure 28A:
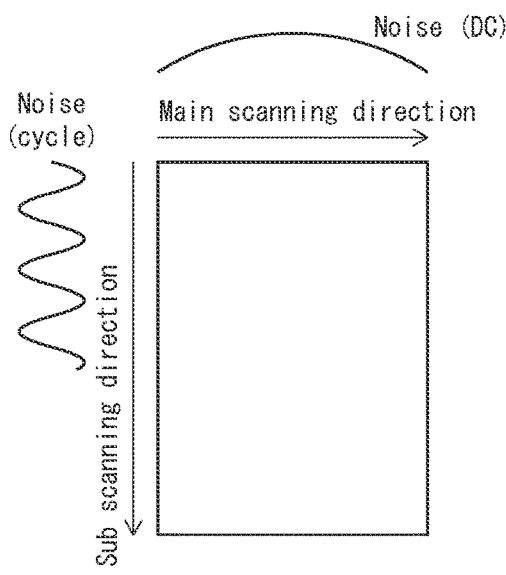
FIG. 28A is a graph illustrating high frequency noise intensity affecting a printed image.
Figure 28B:
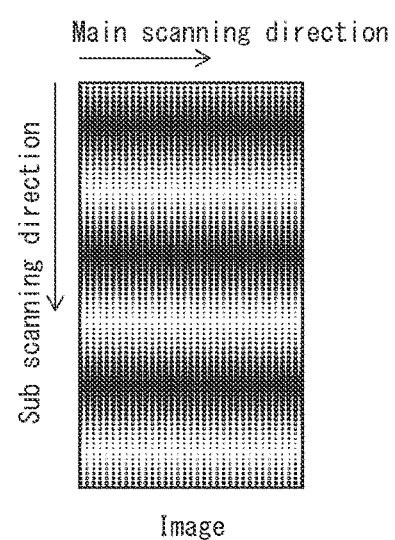
FIG. 28B is a diagram illustrating concentration unevenness caused by high frequency noise.

According to the present modification, in FIG. 25, in order to detect the noise components Ax_1, Ax_75, Ax_150 superimposed on the 1st, 75th, and 150th writing wiring 530, the lead-out lines 531 are drawn from the writing wiring 530 and connected to the corresponding noise detection ADCs 500.

By controlling a selector 2500, the drive IC 302 turns on a noise detection TFT 2501 for which there is a corresponding continuous region in an image region, and turns of a noise detection TFT 2501 for which there is no corresponding continuous region. When the lead-out line 531 is connected, the noise detection ADC 500 can detect the noise component Ax.

Thus, even if there is no continuous region in the image region corresponding to a first DAC 400, as long as there is a continuous region corresponding to another DAC 400, the phase of high frequency noise can be accurately detected.

The high frequency noise data table 726 may be updated when the noise component Ax is detected, and may be stored in the ASIC 306 in advance as initial data. Further, the writing wiring 530 for detecting the noise component Ax is of course not limited to a combination of the 1st, 75th, and 150th writing wiring 530, another combination may be used, and four or more of the writing wiring 530 may be used to detect the noise component Ax.

(7-7) According to at least one embodiment, correcting a luminance signal in a print region is described, but of course image detection including an inter-paper region may be performed and correction may be made.

(7-8) According to at least one embodiment, the controller 101 referencing a luminance signal held by the latch circuit 502 to perform processing correcting the luminance signal is described, but the present invention is of course not limited to this. Alternatively, the drive IC 302 may perform processing correcting the luminance signal. In this case, the drive IC 302 may request processing from the ASIC 306 of the controller 101, or a function corresponding to the ASIC 306 may be mounted on the drive IC 302.

(7-9) According to at least one embodiment, the image forming device 1 is described as a tandem-type color printer, but the present invention is of course not limited to this, and may be applied to a color printer other than a tandem type or a monochrome printer. Further, effects of the present invention can be achieved when applied to a copying device incorporating a scanner, a facsimile device incorporating a communication function, or a multi-function peripheral (MFP) incorporating several such functions.

[8] Outline

An optical print head pertaining to at least one embodiment of the present invention is an optical print head including light emitting elements, drivers, setters, a detector, and a generator. The light emitting elements are arranged in a line-shaped region. The drivers correspond one to one with the light emitting elements, and are for causing the light emitting elements to emit light. The setters are for outputting luminance signals that indicate to the drivers light emission amounts of the light emitting elements according to image data, wherein light emitted by the light emitting elements exposes a photoreceptor surface line by line. The detector is for detecting a noise component superimposed on a luminance signal, on transmission circuitry for transmitting the luminance signal from a setter to a driver, in a state in which the setter is outputting the luminance signal. The generator, for each light emitting element due to emit light in a line subsequent to a line for which the detector detected the noise component, generates and causes a setter corresponding to the light emitting element to output an adjusted luminance signal such that the light emitting element emits a light emission amount according to the image data in a state in which the noise component detected by the detector is superimposed on the adjusted luminance signal.

In this way, a noise component superimposed on a luminance signal can be detected, and an adjusted luminance signal can be generated for a subsequent line according to the noise component detected, and therefore concentration unevenness caused by high frequency noise can be suppressed.

According to at least one embodiment, the drivers are thin film transistors, for each of which a constant voltage is applied to a source terminal, and a drain current corresponding to a gate-source voltage Vgs is supplied to cause a corresponding light emitting element to emit light, and the detector detects the noise component superimposed on a gate voltage of the drivers.

According to at least one embodiment, the setter outputs sequentially to a plurality of drivers, the optical print head further comprising: a switcher provided on the transmission circuitry, for switching across the plurality of drivers, wherein the detector detects the noise component on the transmission circuitry from the setter to the switcher.

According to at least one embodiment, the optical print head further comprises: a determiner for determining from the image data whether or not a lit state of light emitting elements under the switcher is continuous for at least a predefined number of pixels in an image region to be exposed by the light emitting elements under the switcher; and a prohibiter for preventing the detection by the detector when the determiner determines that the lit state is not continuous.

According to at least one embodiment, the detector detects the noise component by obtaining a difference between the luminance signal output by the setter and a signal detected on the transmission circuitry.

According to at least one embodiment, the generator generates the adjusted luminance signal in accordance with a difference between phase of the noise component when the detector detects the noise component and phase of the noise component superimposed on a luminance signal subsequently outputted.

According to at least one embodiment, the transmission circuitry is a plurality of circuits, the detector detects the noise component only for a portion of the circuits of the transmission circuitry, and the generator generates, by using the noise component detected by the detector, the adjusted luminance signal to be transmitted by a circuit of the transmission circuitry for which the detector does not detect the noise component.

According to at least one embodiment, wiring from the transmission circuitry to the detector has a lower wiring impedance than wiring of the transmission circuitry.

An image forming device according to at least one embodiment is an image forming device comprising: an optical print head comprising: light emitting elements arranged in a line-shaped region; drivers corresponding one to one with the light emitting elements, the drivers for causing the light emitting elements to emit light; and setters for outputting luminance signals that indicate to the drivers light emission amounts of the light emitting elements according to image data, wherein light emitted by the light emitting elements exposes a photoreceptor surface line by line; a detector for detecting a noise component superimposed on a luminance signal, on transmission circuitry for transmitting the luminance signal from a setter to a driver, in a state in which the setter is outputting the luminance signal; and a generator that, for each light emitting element due to emit light in a line subsequent to a line for which the detector detected the noise component, generates and causes a setter corresponding to the light emitting element to output an adjusted luminance signal such that the light emitting element emits a light emission amount according to the image data in a state in which the noise component detected by the detector is superimposed on the adjusted luminance signal.

Although one or more embodiments of the present invention have been described and illustrated in detail, the disclosed embodiments are made for the purposes of illustration and example only and not limitation. The scope of the present invention should be interpreted by the terms of the appended claims.

What is claimed is:

1. An optical print head comprising:
light emitting elements arranged in a line-shaped region;
drivers corresponding one to one with the light emitting elements, the drivers for causing the light emitting elements to emit light;
setters for outputting luminance signals that indicate to the drivers light emission amounts of the light emitting elements according to image data, wherein light emitted by the light emitting elements exposes a photoreceptor surface line by line;
a detector for detecting a noise component superimposed on a luminance signal, on transmission circuitry for transmitting the luminance signal from a setter to a driver, in a state in which the setter is outputting the luminance signal; and
a generator that, for each light emitting element due to emit light in a line subsequent to a line for which the detector detected the noise component, generates and causes a setter corresponding to the light emitting element to output an adjusted luminance signal such that the light emitting element emits a light emission amount according to the image data in a state in which the noise component detected by the detector is superimposed on the adjusted luminance signal,
wherein the drivers are thin film transistors, for each of which a constant voltage is applied to a source terminal, and a drain current corresponding to a gate-source voltage Vgs is supplied to cause a corresponding light emitting element to emit light, and
the detector detects the noise component superimposed on a gate voltage of the drivers.

2. The optical print head of claim 1, wherein
the generator generates the adjusted luminance signal in accordance with a difference between phase of the noise component when the detector detects the noise component and phase of the noise component superimposed on a luminance signal subsequently outputted.

3. The optical print head of claim 1, wherein
the transmission circuitry is a plurality of circuits,
the detector detects the noise component only for a portion of the circuits of the transmission circuitry, and
the generator generates, by using the noise component detected by the detector, the adjusted luminance signal to be transmitted by a circuit of the transmission circuitry for which the detector does not detect the noise component.

4. The optical print head of claim 1, wherein
wiring from the transmission circuitry to the detector has a lower wiring impedance than wiring of the transmission circuitry.

5. An image forming device comprising:
an optical print head comprising:
light emitting elements arranged in a line-shaped region;
drivers corresponding one to one with the light emitting elements, the drivers for causing the light emitting elements to emit light; and
setters for outputting luminance signals that indicate to the drivers light emission amounts of the light emitting elements according to image data, wherein light emitted by the light emitting elements exposes a photoreceptor surface line by line;
a detector for detecting a noise component superimposed on a luminance signal, on transmission circuitry for transmitting the luminance signal from a setter to a driver, in a state in which the setter is outputting the luminance signal; and
a generator that, for each light emitting element due to emit light in a line subsequent to a line for which the detector detected the noise component, generates and causes a setter corresponding to the light emitting element to output an adjusted luminance signal such that the light emitting element emits a light emission amount according to the image data in a state in which the noise component detected by the detector is superimposed on the adjusted luminance signal,
wherein the drivers are thin film transistors, for each of which a constant voltage is applied to a source terminal, and a drain current corresponding to a gate-source voltage Vgs is supplied to cause a corresponding light emitting element to emit light, and
the detector detects the noise component superimposed on a gate voltage of the drivers.

6. The optical print head of claim 1, wherein
the line-shaped region of the light emitting element is arranged to extend in a main scanning direction and the light emitted by the light emitting elements exposes the photoreceptor surface to a line of an image.

7. An optical print head comprising:
light emitting elements arranged in a line-shaped region;
drivers corresponding one to one with the light emitting elements, the drivers for causing the light emitting elements to emit light;
setters for outputting luminance signals that indicate to the drivers light emission amounts of the light emitting elements according to image data, wherein light emitted by the light emitting elements exposes a photoreceptor surface line by line;
a detector for detecting a noise component superimposed on a luminance signal, on transmission circuitry for transmitting the luminance signal from a setter to a driver, in a state in which the setter is outputting the luminance signal; and
a generator that, for each light emitting element due to emit light in a line subsequent to a line for which the detector detected the noise component, generates and causes a setter corresponding to the light emitting element to output an adjusted luminance signal such that the light emitting element emits a light emission amount according to the image data in a state in which the noise component detected by the detector is superimposed on the adjusted luminance signal,
wherein the setter outputs sequentially to a plurality of drivers, the optical print head further comprising:
a switcher provided on the transmission circuitry, for switching across the plurality of drivers, wherein
the detector detects the noise component on the transmission circuitry from the setter to the switcher.

8. The optical print head of claim 7, further comprising:
a determiner for determining from the image data whether or not a lit state of light emitting elements under the switcher is continuous for at least a predefined number of pixels in an image region to be exposed by the light emitting elements under the switcher; and
a prohibiter for preventing the detection by the detector when the determiner determines that the lit state is not continuous.

9. The optical print head of claim 7, wherein
the detector detects the noise component by obtaining a difference between the luminance signal output by the setter and a signal detected on the transmission circuitry.

* * * * *